(12) United States Patent
Cotton et al.

(10) Patent No.: US 6,457,834 B1
(45) Date of Patent: Oct. 1, 2002

(54) OPTICAL SYSTEM FOR DISPLAY PANEL

(75) Inventors: Christopher T. Cotton, Honeoye Falls; James T. Veligdan, Manorville, both of NY (US); Milton J. Shoup, III, Sunderland, MD (US)

(73) Assignee: Scram Technologies, Inc., Dunkirk, MD (US)

( * ) Notice: Subject to any disclaimer, the term of this patent is extended or adjusted under 35 U.S.C. 154(b) by 0 days.

(21) Appl. No.: 09/768,639

(22) Filed: Jan. 24, 2001

(51) Int. Cl.[7] .................. G03B 21/00; G03B 21/14; G03B 21/28
(52) U.S. Cl. ................ 353/122; 353/69; 353/70; 353/98; 385/901
(58) Field of Search ............... 385/901; 353/69, 353/70, 98, 122

(56) References Cited

U.S. PATENT DOCUMENTS

| | | | | |
|---|---|---|---|---|
| 5,381,502 A | * | 1/1995 | Veligdan | 385/115 |
| 5,625,736 A | * | 4/1997 | Veligdan | 385/120 |
| 5,716,118 A | | 2/1998 | Sato et al. | 353/98 |
| 6,002,826 A | * | 12/1999 | Veligdan | 385/120 |
| 6,222,971 B1 | * | 4/2001 | Veligdan et al. | 385/120 |
| 6,301,417 B1 | * | 10/2001 | Biscardi et al. | 385/120 |
| 6,307,995 B1 | * | 10/2001 | Veligdan | 385/129 |
| 6,317,545 B1 | * | 11/2001 | Veligdan | 385/120 |
| 6,328,448 B1 | * | 12/2001 | Beiser | 353/70 |

\* cited by examiner

Primary Examiner—Christopher Mahoney
Assistant Examiner—Magda Cruz
(74) Attorney, Agent, or Firm—Reed Smith, LLP; William J. McNichol, Jr.; Matthew J. Esserman

(57) ABSTRACT

An optical system for producing an accurate image on an optical panel inlet face surface which is highly tilted relative to the image path. The optical system comprises an image source and an imaging element that creates an image from the image source. The optical system also comprises an anamorphic telescope for reducing anamorphic distortion of the image, and a final element for directing the image toward the optical panel. The anamorphic telescope reduces magnification of the image in a first direction and enlarges magnification of the image in a second direction which is perpendicular to the first direction. The anamorphic telescope includes a first lens group, a second lens group, and a third lens group. The first lens group and the second lens group form a first anamorphic telescopic system, and the second lens group and the third lens group form a second anamorphic telescopic system.

116 Claims, 12 Drawing Sheets

OPTICAL SYSTEM FOR DISPLAY PANEL

BACKGROUND OF THE INVENTION

1. Field of the Invention

The present invention relates generally to the field of display devices. In particular, the present invention relates to an optical system and method for coupling an image onto a display device. More specifically, the present invention relates to an optical system and method for coupling an image onto an ultrathin planar optical display device which is capable of reducing or eliminating distortions that typically occur when an image is projected onto a display device which is tilted in relation to the incident image.

2. Description of the Background

Optical screens typically use cathode ray tubes (CRTs) for projecting images onto the screen. The standard TV screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels may be made by stacking optical waveguides, each waveguide having a first end and a second end, wherein an outlet face is defined by the plurality of first ends, and wherein an inlet face is defined by the plurality of second ends. Such a panel may be thin in its depth compared to its height and width, and the cladding of the waveguides may be made black to increase the black surface area, but such a panel may require expensive and cumbersome projection equipment to distribute the image light across the inlet face, which equipment thereby increases the total size and cost of the panel.

Therefore, the need exists for an optical panel which possesses the advantages corresponding to a stacked waveguide panel, but which does not require the use of expensive and cumbersome projection equipment, nor suffer from the increase in size and cost necessitated by such equipment.

In optical panels where the depth of the housing (containing the optical panel and projection equipment) is desired to be at a minimum, the projection equipment is typically positioned to accommodate these overall dimension constraints. The positioning of the projection equipment may therefore require the image path to be directed at an acute angle with respect to the targeted outlet face of the panel. Thus, since the surface of the outlet face is generally highly tilted relative to the image path, an imaging system which is capable of producing an image which is focused and is without distortions is critical. Not only is a properly focused image desired, but an image produced on the surface of the outlet face must also have little or no chromatic distortion and must retain the desired aspect ratio while maintaining a linear point-to-point mapping of the image.

Therefore, the need also exists for an optical system for an optical panel which is capable of producing an accurate image on a highly tilted inlet face surface relative to the image path, and which does not suffer from improperly focused images and image distortions which yield chromatic distortions, false aspect ratios, and inconsistent, linear point-to-point mapping of the image.

SUMMARY OF THE INVENTION

The present invention is directed to an optical system for projecting an image onto a display image plane at an incident angle which is greater than zero. The optical system comprises an image source and an imaging element. The imaging element creates an image from the image source. The optical system also comprises an anamorphic telescope for reducing anamorphic distortion of the image, and a final mirror for reflecting the image toward the display image plane. The anamorphic telescope reduces magnification of the image in a first direction and enlarges magnification of the image in a second direction which is perpendicular to the first direction. Moreover, the anamorphic telescope includes a first lens group, a second lens group, and a third lens group. The first lens group and the second lens group form a first anamorphic telescopic system, and the second lens group and the third lens group form a second anamorphic telescopic system. The anamorphic telescope also may be constructed of more than one optical material to correct chromatic aberrations of the image. The present invention is also directed to a display system which includes the combination of an optical system and an optical panel.

The present invention solves problems experienced in the prior art, such as the use of expensive and cumbersome projection equipment, by providing an optical system having a reduced optical path that produces an accurate image on a highly tilted inlet face surface relative to the image path, and which does not suffer from chromatic distortion, improperly focused images, image distortions which yield false aspect ratios or inconsistent point-to-point mapping to the image. The present invention also retains the advantages which correspond to a stacked waveguide panel, such as improved contrast and minimized depth of the panel and surrounding housing.

Those and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

For purposes of this disclosure, the phrase "optical waveguide" is defined so as to include any type of light guiding member that utilizes total internal reflection to guide light.

Figure 1:
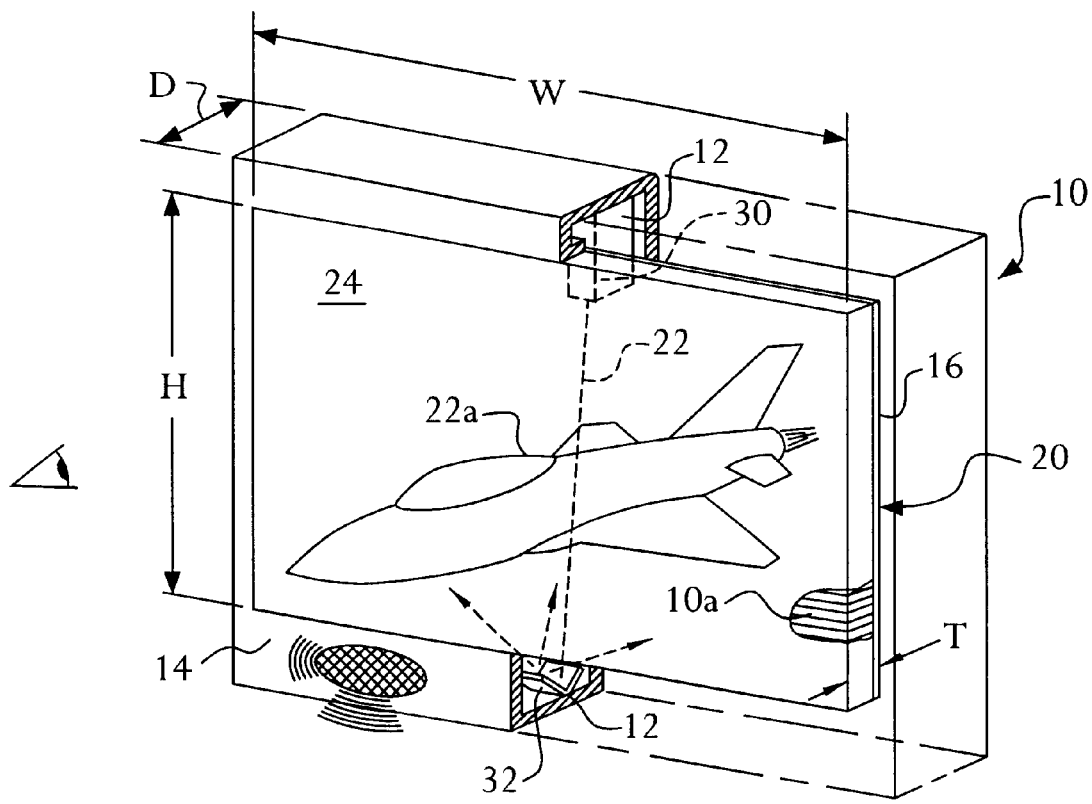
FIG. 1 is an isometric view partly cross sectional schematic illustrating an ultrathin optical panel.

FIG. 1 is an isometric view schematic illustrating an optical panel 10. The optical panel 10 includes a plurality of waveguides 10a, wherein one end of each waveguide 10a forms an inlet for that waveguide, and wherein the opposite end of each waveguide 10a forms an outlet for that waveguide, a light generation system 12, a housing 14 in which the light generation system 12 and the plurality of waveguides 10a are mounted, and a coupler 16.

Each waveguide 10a extends horizontally, and the plurality of stacked waveguides 10a extends vertically. The plurality of inlet ends define an inlet face 20 for receiving image light 22. The plurality of outlet ends define an outlet face 24 disposed substantially parallel with the inlet face 20 for displaying light 22. The light 22 may be displayed in a form such as, but not limited to, a video image 22a.

The housing 14 is sized larger in height and width than the combination of the light generation system 12 and the plurality of waveguides 10a, to allow the placement of the plurality of waveguides 10a and light generation system 12 therein. The housing 14 has an open front to allow for viewing of the outlet face 24, and has a closed depth D looking from the open front to the back of the housing 14.

The light generation system 12 provides the light 22 viewed through the waveguides 10a. The light generation system 12 includes a light source 30, and a light redirection element 32 that redirects incident light 22 from the light source 30 into the coupler 16, which light redirection element 32, in combination with the coupler 16, allows for a reduction in the depth D of the housing 14. This reduction allowance occurs where the light redirection element 32 is configured for turning the light 22 from a source 30, which source 30 is placed within the housing 14 proximate to and parallel with the vertical stack of the plurality of waveguides 10a, into the coupler 16, which then acutely turns the light 22 into the waveguides 10a. The coupler 16 is preferably effective for turning the image light in an exemplary range of about 45° up to about 90°, in order to generate approximately horizontal transmission through the plurality of waveguides 10a. The light generation system 12 may also include a modulator 62 and further imaging optics 64 and is discussed with more particularity with respect to FIG. 2.

The parallel surfaces of the inlet face 20 and the outlet face 24 allow the panel 10 and enclosing housing 14 to be made ultrathin in depth. The panel 10 has a nominal thickness T which is the depth of the waveguides 10a between the inlet face 20 and the outlet face 24, and thickness T is substantially less than the height H and width W of the outlet face 24. The panel 10 may be configured in typical television width to height ratios of 4:3 or 16:9, for example. For a height H of about 55 cm and a width W of about 73 cm, the panel thickness T of the present invention may be about 1 cm. The depth D may vary accordingly with the thickness T, but, in the embodiment described hereinabove, the depth D of the housing 14 is preferably no greater than about 17 cm.

Figure 2:
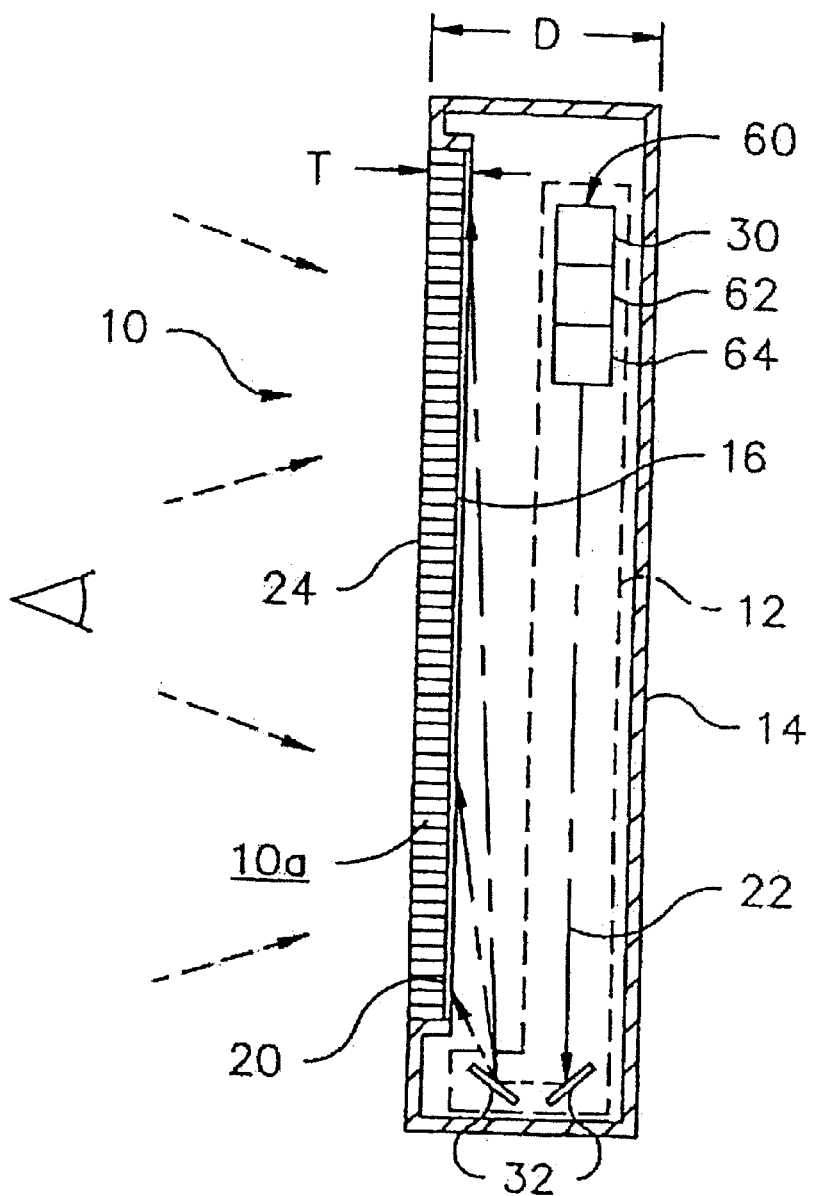
FIG. 2 is a side view cross sectional schematic of an ultrathin optical panel and a light generation system.

FIG. 2 is a side view cross sectional schematic of an ultrathin optical panel 10. The panel 10 includes a plurality of stacked waveguides 10a, a light generation system 12, a coupler 16, and a housing 14.

The light generation system 12, in one embodiment of the present invention, includes a projector 60 which is optically aligned with a light redirection element 32. An image is projected onto the light redirection element 32, and is then redirected to the coupler 16 for transmission through the waveguides 10a for display on the outlet face 24. In a preferred embodiment, the projector 60 is disposed adjacent to the top of the inlet face 20 for projecting the image light 22 generally parallel thereto, and is spaced therefrom a distance sufficient to allow for a turning of the image light 22 from the light redirection element 32 into the coupler 16 for transmission through the waveguides 10a.

The projector 60 may include a suitable light source 30 for producing the light 22. The light source 30 may be a light bulb (e.g. filament or arc type) or laser. The projector 60 may be a slide projector or video projector which may include a modulator 62 for modulating the light 22 to form an image 22a. The modulator 62 may be, for example, a conventional Liquid Crystal Display (LCD), a Digital Micromirror Device (DMD), a Grating Light Valve (GLV), a laser raster scanner, a Phase Dispersed Liquid Crystal (PDLC), a Liquid Crystal on Silicon (LCOS), a Micro Electrical Mechanical System (MEMS), or a CRT. The projector 60 may also include suitable image optics 64 for distributing or broadcasting the image light 22 horizontally and vertically across the light redirection element 32 for properly focused transmission to the coupler 16. The image optics 64 may include focusing and expanding lenses and/or mirrors. One or more light generation systems 12, such as between 2 and 4 such systems, may be used to provide light to one or more portions of the coupler 16. Expansion lenses may be used for both the imaging optics 64 and the light redirection element 32 to expand the image light 22 both vertically and horizontally over the coupler 16. Alternatively, suitable rastering systems may be used as the light generation system 12 to form the image by rastering the image light 22 both horizontally and vertically across the coupler 16.

In the illustrated embodiment, the light 22 is initially projected from the projector 60 vertically downward inside the housing 14 to the bottom thereof where the light redirection elements 32 are mounted, and the light redirection elements 32 then redirect the image light 22 vertically upwardly at a large angle relative to the surface normal of the panel 10 for broadcast over the entire exposed surface of the coupler 16. In an alternative embodiment, the projector 60 could be placed beneath or to either side of the inlet face 20 rather than behind the inlet face 20.

The allowable incidence angle of the image light 22 on the coupler 16 is determined by the capability of the coupler 16 to turn the light 22 into the inlet face 20 of the panel 10. The greater the turning capability of the coupler 16, the closer the projector 60 may be mounted to the coupler 16 for reducing the required depth D of the housing 14.

Figure 3:
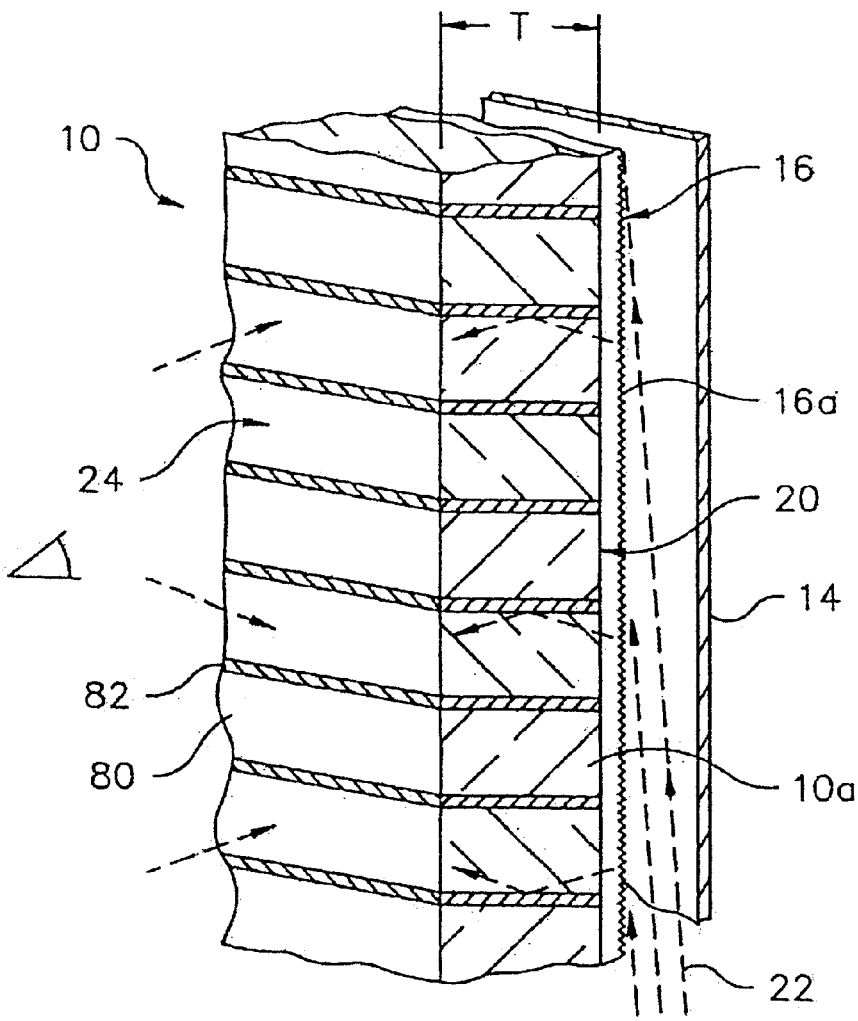
FIG. 3 is a schematic illustrating a horizontal and vertical cross section of an ultrathin optical panel using a prismatic coupler.

FIG. 3 is a schematic illustrating a horizontal and vertical cross section of an ultrathin optical panel 10. The panel 10 includes a plurality of vertically stacked optical waveguides 10a, a light generation system 12 (see FIG. 2), a coupler 16, and a housing 14.

Each waveguide 10a of the plurality of waveguides 10a includes a central transparent core 80 having a first index of refraction. The core 80 may be formed of any material known in the art to be suitable for passing light waves therethrough, such as, but not limited to plexiglass or polymers. The central core 80 may be formed of an optical plastic, such as Lexan®, commercially available from the General Electric Company®, or glass, such as type BK7. A preferred embodiment of the present invention is implemented using individual glass sheets, which are typically in the range between 2 and 1000 microns thick, and which may be of a manageable length and width. The central core 80 is laminated between at least two cladding layers 82. The cladding layers 82 immediately in contact with the cores 80 have a second index of refraction lower than that of the cores 80, thus allowing for substantially total internal reflection of the light 22 as it is transmitted through the cores 80. The cladding 82 may be a suitable plastic, plexiglass, glass, adhesive, polyurethane, low refractive index polymer, or epoxy, for example, and is preferably black in color. Where multiple cladding layers 82 are used, it is preferable that a clear cladding layer contact the glass, and a black pigmented layer be disposed between adjacent clear cladding layers, thus improving both viewing contrast of the outlet face 24 and internal reflection of the light 22 through the core 80. The use of at least one black pigmented layer provides improved contrast by providing additional blackness at the outlet face 24. Further, the exposed edges of the black pigmented layer at the outlet face 24 are directly viewable by the observer. Additionally, ambient light which enters the waveguides off-axis through the outlet face 24 will be absorbed internally by the black pigmented layer. The black pigmented layer may be formed in any suitable manner such as with black spray paint, or carbon particles within an epoxy adhesive joining together the adjacent cores 80 in one or more black pigmented layers. The manner of forming the cladding layers 82 and cores 80 is discussed with more specificity hereinbelow.

The waveguides 10a of a preferred embodiment are in the form of flat ribbons extending continuously in the horizontal direction along the width of the outlet face 24. The ribbon waveguides 10a are preferably stacked vertically along the height of the outlet face 24. The vertical resolution of the panel 10 is thus dependent on the number of waveguides 10a stacked along the height of the outlet face 24. For example, a stacking of 525 waveguides would provide 525 vertical lines of resolution. A greater number of waveguides can of course be envisioned resulting in a higher corresponding resolution.

The plurality of stacked waveguides 10a may be formed by first laying a first glass sheet in a trough sized slightly larger than the first glass sheet. The trough may then be filled with a thermally curing epoxy. The epoxy is preferably black, in order to form a black layer between waveguides, thereby providing improved viewing contrast. Furthermore, the epoxy should possess the properties of a suitable cladding layer 82, such as having a lower index of refraction than the glass sheets to allow substantially total internal reflection of the light 22 within the glass sheet. After filling of the trough, glass sheets 80 are repeatedly stacked, and a layer of epoxy forms between each glass sheet 80. The stacking is preferably repeated until between approximately 500 and 2000 sheets have been stacked. Uniform pressure may then be applied to the stack, thereby causing the epoxy to flow to a generally uniform level between glass sheets 80. In a preferred embodiment of the present invention, the uniform level obtained is approximately 0.0002" between glass sheets 80. The stack may then be baked to cure at an elevated temperature for such time as is necessary to cure the epoxy, and the stack is then allowed to cool slowly in order to prevent cracking of the glass. After curing, the stack may be placed against a saw, such as, but not limited to, a diamond saw, and cut to a desired size. The cut portions of the panel 10 may then be polished to remove any saw marks.

In an alternative embodiment of the present invention, a plurality of glass sheets 80 are individually coated with, or dipped within, a substance having an index of refraction lower than that of the glass, and the plurality of coated sheets are fastened together using glue or thermally curing epoxy, which is preferably black in color. A first coated glass sheet 10a is placed in a trough sized slightly larger than the first coated glass sheet 10a, the trough is filled with a thermally curing black epoxy, and the coated glass sheets 10a are repeatedly stacked, forming a layer of epoxy between each coated glass sheet 10a. The stacking is preferably repeated until between approximately 500 and 2000 sheets have been stacked. Uniform pressure may then be applied to the stack, followed by a cure of the epoxy, and a sawing of the stack into a desired size. The stack may be sawed curved or flat, and may be frosted or polished after sawing.

In another alternative embodiment of the present invention, the glass sheets 80 preferably have a width in the range between 0.5" and 1.0", and are of a manageable length, such as between 12" and 36". The sheets 80 are stacked, with a layer of black ultraviolet adhesive being placed between each sheet 80. Ultraviolet radiation is then used to cure each adhesive layer, and the stack may then be cut and/or polished.

After sawing and/or polishing the stack, each of the above embodiments of the method may also include bonding a coupler 16 to the inlet face 20 of the stack, and fastening the stack, having the coupler 16 bonded thereto, within the rectangular housing 14. The stack is fastened such that the open front of the housing 14 is aligned with the outlet face 24, and the light generator 12 within the housing 14 is optically aligned with the coupler 16.

The light generation system 12 provides light 22 which is incident on the coupler 16, and is configured substantially as discussed with respect to FIG. 2. The light source 30 of the light generation system 12 may be mounted within the housing 14 in a suitable location to minimize the volume and depth of the housing 14. The source 30 can be mounted within the housing 14 directly behind the inlet face 20 at the top thereof to initially project light 22 vertically downwardly, which light 22 is then turned by light redirection elements 32 of the light generation system 12 vertically upwardly to optically engage the coupler 16. In a preferred embodiment of the present invention, the individual waveguides 10a extend horizontally without inclination, thus allowing the image to be transmitted directly horizontally through the waveguides 10a for direct viewing by an observer, thereby allowing the viewer to receive full intensity of the light 22 for maximum brightness. Another embodiment could include inclination of the waveguides 10a. A sheet of diffusing material may optionally be provided on the outlet face 24 to effect an improved viewing angle of the display. Alternatively, instead of a sheet of diffusing material, a diffusing surface may be formed into the outlet face 24 itself to effect a similarly improved viewing angle. Thus, for maximum brightness, the light 22 incident from the light generation system 12 must be turned substantially horizontally. A prismatic coupler 16 may be used to turn the light at an angle up to 90 degrees for entry into the inlet face 20. In one embodiment of the present invention, a Transmissive Right Angle Film (TRAF) turns the light at an angle of 81 degrees.

The light coupler 16 adjoins the entire inlet face 20 and may be suitably bonded thereto for coupling or redirecting the light 22 incident from the light generation system 12 into the inlet face 20 for transmission through the waveguides 10a. The waveguides 10a (i.e. more specifically, cores 80) of the present invention may have a limited acceptance angle for receiving incident light 22, and the coupler 16 is aligned to ensure that the image light 22 is suitably turned to enter the waveguide cores 80 within the allowable acceptance angle.

In a preferred embodiment of the present invention, the coupler 16 includes prismatic grooves 16a that are straight along the width of the inlet face 20 and are spaced vertically apart along the height of the inlet face 20, which prismatic coupler 16 is capable of turning light up to an angle of 90 degrees. In another preferred embodiment of the present invention, the prismatic coupler 16 is a TRAF commercially available from the 3M Company® of St. Paul, Minneapolis, under the tradename TRAF II®. An optional reflector may be disposed closely adjacent to the prismatic coupler 16 for reflecting back into the waveguides 10a any stray light 22 at the grooves 16a. As still another preferred embodiment of the present invention, the coupler 16 (or light redirecting surface) may instead be formed into the inlet face 20 itself.

The coupler 16 may also take the form of a diffractive element 16. The diffractive coupler 16 includes a diffractive grating having a large number of small grooves extending horizontally and parallel with the individual waveguides 10a, which grooves are closely spaced together in the vertical direction over the height of the inlet face 20. The coupler 16 may take other forms as well, including, but not limited to, holographic or Fresnel elements. It may also be envisioned that a coupler 16 may optionally be omitted from the panel 10 depending on the orientation of the panel 10 with respect to the optical system employed.

The housing 14 supports the waveguide stack 10a and the light generation system 12 in a substantially closed enclosure. The outlet face 24 faces outwardly and is exposed to the viewer and ambient light, and the inlet face 20 and adjoining coupler 16 face inwardly toward preferably black surfaces within the housing 14, thereby providing additional black for contrast at the outlet face 24. This additional black is provided at the outlet face 24 due to the passive nature of the waveguides 10a and the coupler 16. When these passive devices are enclosed in a black area, the outlet face 24 will appear black when not illuminated by image light 22 incident on the inlet face 20.

Figure 4:
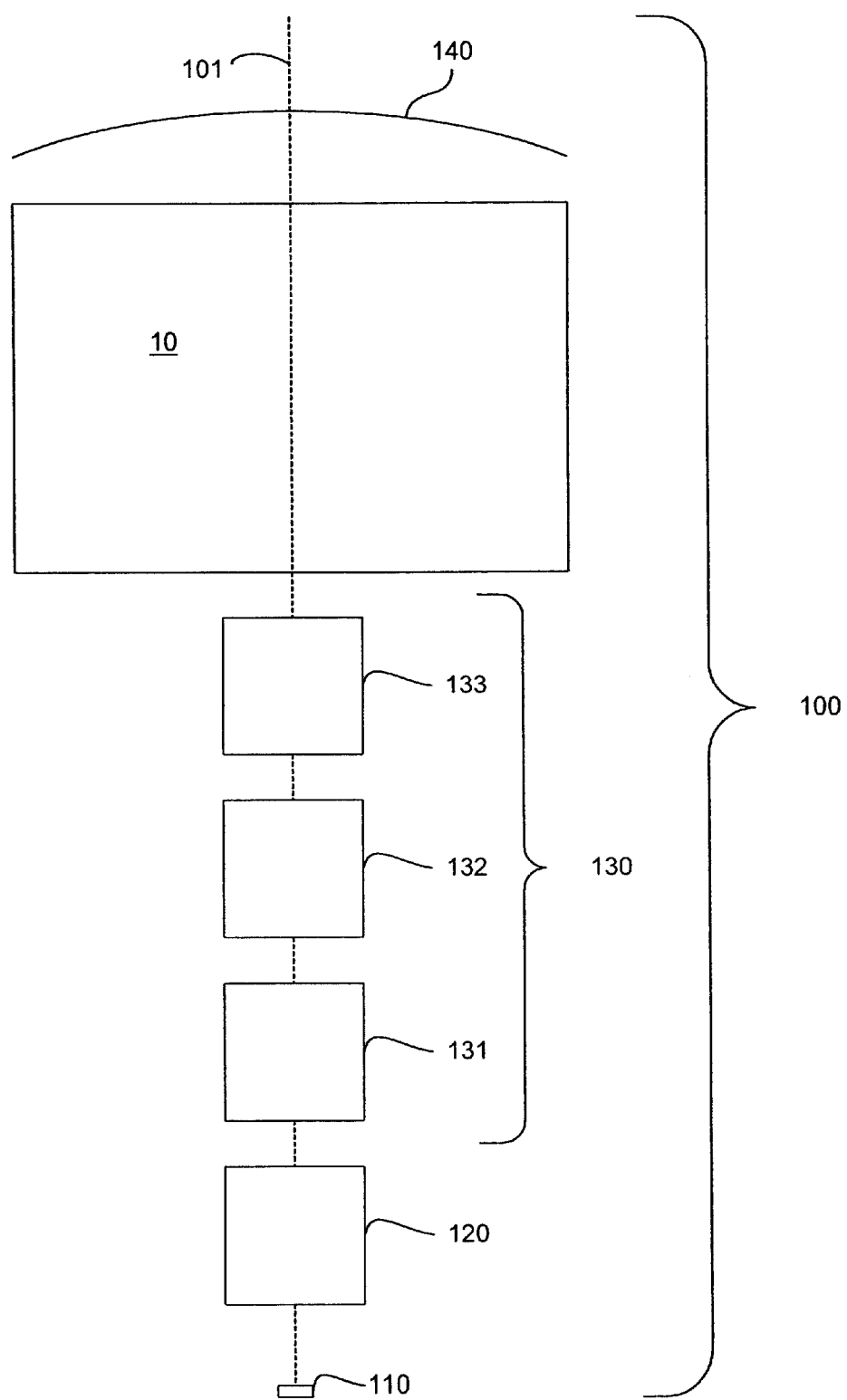
FIG. 4 is a simplified rear view schematic illustrating an optical system in conjunction with an optical panel.

FIG. 4 is a simplified rear view schematic illustrating an optical system 100 (i.e. excluding the panel 10) used to project an image from an image source 110 onto an optical panel 10 (also shown for illustration purposes in FIG. 4). The optical system 100 may replace the light generation system 12 as described above in conjunction with FIG. 2. The optical system 100 includes an image source 110, an imaging element 120, an anamorphic telescope 130, and a final mirror 140. The optical panel 10 may be of the type described in the above embodiments with respect to FIGS. 1–3. Alternatively, the optical panel 10 may be of different type dependent on design choice or routine experimentation by the skilled artisan. For example, the optical panel 10 may be a conventional lenticular rear projection screen. The image source 110, imaging element 120, anamorphic telescope 130, and final mirror 140 are preferably all nominally symmetric about a single plane that ideally contains all of the centers of curvature of the optical elements. For purposes of this discussion only, this plane will be referred to herein as the "y-z plane".

Figure 5:
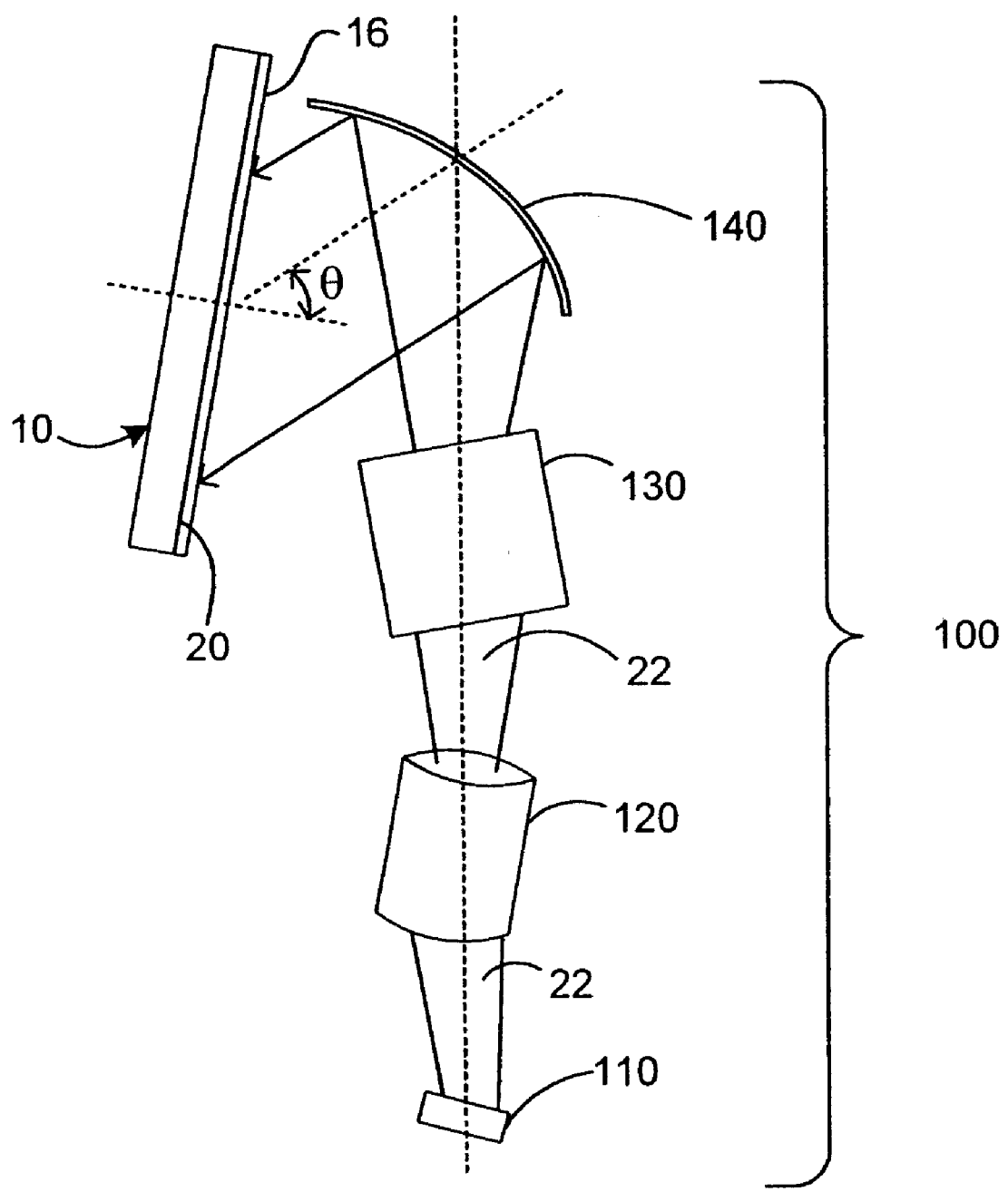
FIG. 5 is a side view schematic of an ultrathin optical panel using a preferred optical system.

As used herein, the incident angle θ is defined as the angle formed between a line drawn from the center of the image source to the center of the display image plane, and a line perpendicular to the display image plane. As illustrated in FIG. 5, the line from the center of the image source to the center of the display image plane is reflected via final mirror 140. The image is projected onto the display image plane at an incident angle θ preferably greater than zero. In a preferred embodiment of the invention, incident angle θ is in the range of approximately 50°–85°. In a more preferred embodiment of the invention, incident angle θ is approximately 78°.

Since the tilt associated with this configuration is substantial, optical tilting of the image source or plane is preferably spread out gradually over the entire optical train. In other words, the optical elements in the optical train, i.e. the imaging element 120, the anamorphic telescope 130, and the final mirror 140, each effect a tilt on the image of the object. However, it is possible to accomplish this using only one or some of the optical elements in the optical train. The image source 110 and the imaging element 120 are each tilted about the x-axis. Tilting the image source 110, the imaging element 120, and panel 10 in this way makes use of the Scheimpflug rule to effect an intermediate tilt on the virtual intermediate image plane.

The imaging element 120 creates a virtual image in a virtual intermediate image plane at an angle intermediate to the angle between the plane of the image source 110 (the "object plane") and the targeted inlet face 20 plane (the "display image plane"). The anamorphic telescope 130 and final mirror 140 are also tilted about the x-axis to effect a further tilt of the final image plane. Although the tilting by the anamorphic telescope 130 is not required for the optical system 100 to produce a tilted image, it is useful to provide some degree of tilt by the anamorphic telescope 130 to thereby improve image quality.

The image source 110 may be an illuminated object, e.g. an LCD or a DMD, or an emissive object, e.g. an LED array or a laser. In a preferred embodiment, the image source 110 is a chromatic image-combining projector. The imaging element 120 enlarges magnification of an image from the image source 110 in a first direction and in a second direction which is perpendicular to the first direction. In a preferred embodiment, the imaging element 120 enlarges magnification of an image from the image source 110 equally in a first direction and in a second direction which is perpendicular to the first direction. The imaging element 120 may include at least one lens which is comprised of a low color dispersion material, and at least one additional lens which is comprised of a high color dispersion material such that chromatic aberration (i.e. in both lateral and longitudinal directions) of the image is corrected. For purposes of this disclosure, low color dispersion material is a material which exhibits less color separation associated with it when light refracts at it's surface as compared to a high color dispersion material. Examples of low color dispersion materials are acrylic and Zeonex®. Zeonex® is commercially available by Zeon Chemicals in Louisville, Ky. Examples of high color dispersion materials are polystyrene and polycarbonate. Other low and high color dispersion materials may of course be used in the practice of this invention.

When light refracts at the surface of a lens, for example, constructed of a low color dispersion material, longitudinal color separation occurs. After the light has traversed through the lens and is refracted again at the second surface, both longitudinal color separation and lateral color offset may be present. It is possible to utilize a second lens constructed of a high color dispersion material and having a compensating shape so that when positioned adjacent to or in the vicinity of the first lens, the effect is to undo the color separation and color offset. In a preferred embodiment, a first lens is constructed of a low color dispersion material which causes the color spread which may be undone by positioning a second lens constructed of a high color dispersion material adjacent to or in its vicinity. Of course, the first lens may alternatively be a high color dispersion material followed by a compensating second lens of low color dispersion material. Utilizing a pair of materials exhibiting dissimilar color dispersion values allows each pair to function similarly to a (combined) singular element, i.e. without any color separation. In utilizing this type of "paired materials" for each lens group, colors never separate beyond the respective lens groups and all the colors follow the same or similar optical path.

A majority of the color correction is performed in the imaging element 120. In a preferred embodiment, the imaging element 120 includes three lenses which are comprised of a low color dispersion material, and two lenses which are comprised of a high color dispersion material. The individual lenses which comprises the imaging element 120 are illustrated in detail in FIGS. 6–10. The imaging element 120 comprises at least one rotationally symmetric surface and the lenses comprising the imaging element 120 are comprised of either glass or plastic or a combination of glass and plastic. The imaging element 120 may comprise at least one surface of the spherical, aspherical, diffractive, or Fresnel type, or a combination of these surface types. Also, the imaging element 120 comprises at least one lens which is tilted and decentered with respect to a central longitudinal optical axis of the image source 110. Preferably, the imaging element 120 consists of lenses which are all tilted and decentered as an entire group with respect to the central longitudinal optical axis of the image source 110.

The anamorphic telescope 130 is provided in the optical system 100 mainly for reducing anamorphic distortion of the image and is preferably positioned subsequent the imaging element 120 within the optical path of the optical system 100. Although, in some configurations, it may be desirable to position the imaging element 120 subsequent the anamorphic telescope 130 within the optical path of the optical system 100. For purposes of this disclosure, a fully focused anamorphic optical system has different magnification of an image in a first direction (e.g. horizontal) than in a second direction (e.g. vertical) which is perpendicular to the first direction.

In a display system where a focused 4:3 projected image is to be displayed on a display image plane which is tilted dramatically about a horizontal axis, the horizontal extent of the image is relatively unaffected while the vertical extent of the image is significantly elongated. A conventional anamorphic optical system would typically either shrink the elongated image vertically while leaving the horizontal aspect of the image unaffected, or enlarge the elongated image horizontally while leaving the vertical aspect of the image unaffected. This type of "classic" anamorphic system utilizes two lens groups and may be referred to as a type of anamorphic telescope. However, utilizing a classic anamorphic telescope (i.e. consisting of two lens groups) provides all the anamorphic correction into one axis. To use this approach to achieve the result of the present invention, very powerful optic lenses would be required that could yield serious design problems, such as the inability to provide pre-correction of trapezoidal image distortion (otherwise known as "keystone-type" distortion) resulting from utilizing a highly tilted display image plane, chromatic aberration and poor focus of the image.

To overcome the aforementioned drawbacks of a classic anamorphic telescope, the anamorphic telescope 130 of the present invention is utilized. The anamorphic telescope 130 reduces magnification of the image in a first direction and enlarges magnification of the image in a second direction which is perpendicular to the first direction. The anamorphic telescope 130 includes three lens groups, i.e. a first lens group 131, a second lens group 132, and a third lens group 133. The first lens group 131 and the second lens group 132 form a first anamorphic telescopic system. The second lens group 132 and the third lens group 133 form a second anamorphic telescopic system. The first anamorphic telescopic system is used to reduce magnification of the image in a first direction, while the second anamorphic telescopic system enlarges magnification of the image in a second direction which is perpendicular to the first direction. The functions of the first and second anamorphic telescopic systems may optionally be reversed. In other words, the second anamorphic telescopic system may be used to reduce magnification of the image in the first direction, while the first anamorphic telescopic system enlarges magnification of the image in the second direction.

It is apparent that the second lens group 132 has the dual role of functioning as a lens group for both the first anamorphic telescopic system and the second anamorphic telescopic system. The utilization of the second lens group 132 in this fashion (i.e. as part of both the first anamorphic telescopic system and the second anamorphic telescopic system) enables the optical system to provide a relatively gentle (i.e. as compared to a classic anamorphic system) reduction of the image in the first direction by having relatively gentle (i.e. as compared to a classic anamorphic system) expansion of the image in the second direction, all the while providing a compact optical system. The combined use of the first anamorphic telescopic system to reduce magnification of the image in the first direction and the second anamorphic telescopic system to enlarge magnification of the image in the second direction result in an accurate final aspect ratio of the image that has consistent linear point-to-point mapping of the image.

Within each of the three lens groups, there is at least one cylindrical or bi-laterally symmetrical element which may have an aspherical surface. In a preferred embodiment, the first lens group 131 comprises two off-axis rotationally symmetric surfaces and two conic cylindrical surfaces although it may be envisioned that more or less lenses may be utilized within the scope of the invention. The first lens group 131 produces negative power in the first direction and positive power in the second direction which is perpendicular to the first direction. The first lens group 131 may include at least one lens which is comprised of a low color dispersion material, and at least one additional lens which is comprised of a high color dispersion material such that chromatic aberration of the image is corrected. Examples of low color dispersion materials are acrylic and Zeonex®. An example of a high color dispersion material is polystyrene. Other low and high color dispersion materials may of course be used in the practice of this invention. In a preferred embodiment, the first lens group 131 includes one lens which is comprised of a low color dispersion material, and another lens which is comprised of a high color dispersion material. The individual lenses which comprises the first lens group 131 are illustrated in detail in FIGS. 6–10. The first lens group 131 may comprise at least one rotationally symmetric surface and the lenses comprising the first lens group 131 are comprised of either glass or plastic or a combination of glass and plastic. The first lens group 131 may comprise at least one surface of the spherical, aspherical, diffractive, or Fresnel type, or a combination of these surface types. Also, the first lens group 131 may comprise at least one lens which is tilted and decentered with respect to a central longitudinal optical axis of the lenses which comprise the imaging element 120. Preferably, the first lens group 131 consists of lenses which are all tilted and decentered with respect to the central longitudinal optical axis of the lenses which comprise the imaging element 120.

The second lens group 132 preferably comprises two off-axis rotationally symmetric surfaces and two conic cylindrical surfaces although it may be envisioned that more or less lenses may be utilized within the scope of the invention. The second lens group 132 produces positive power in the first direction and positive power in the second direction which is perpendicular to the first direction. The second lens group 132 may include at least one lens which is comprised of a low color dispersion material, and at least one additional lens which is comprised of a high color dispersion material such that chromatic aberration of the image is corrected. Examples of low color dispersion materials are acrylic and Zeonex®. An example of a high color dispersion material is polystyrene. Other low and high color dispersion materials may of course be used in the practice of this invention. In a preferred embodiment, the second lens group 132 includes one lens which is comprised of a low color dispersion material, and another lens which is comprised of a high color dispersion material. The individual lenses which comprises the second lens group 132 are illustrated in detail in FIGS. 6–10. The second lens group 132 may comprise at least one rotationally symmetric surface and the lenses comprising the second lens group 132 are comprised of either glass or plastic or a combination of glass and plastic. The second lens group 132 may comprise at least one surface of the spherical, aspherical, diffractive, or Fresnel type, or a combination of these surface types. Also, the second lens group 132 may comprise at least one lens which is tilted and decentered with respect to a central longitudinal optical axis of the lenses which comprise the imaging element 120. Preferably, the second lens group 132 consists of lenses which are all tilted and decentered with respect to the central longitudinal optical axis of the lenses which comprise the imaging element 120.

The third lens group 133 preferably comprises one off-axis rotationally symmetric surfaces and five conic cylindrical surfaces although it may be envisioned that more or less lenses may be utilized within the scope of the invention. The third lens group 133 produces positive power in the first direction and negative power in the second direction which is perpendicular to the first direction. The reduction in the magnification in the first direction was accomplished by the negative power in the first lens group 131 and the positive power in the second lens group 132. The enlargement in the magnification in the second direction was accomplished by the positive power in the second lens group 132 and the negative power in the third lens group 133. In a preferred embodiment, the first lens group 131 produces low positive power in the second direction, and the third lens group 133 produces low positive power in the first direction. The third lens group 133 may include at least one lens which is comprised of a low color dispersion material, and at least one additional lens which is comprised of a high color dispersion material such that chromatic aberration of the image is corrected. Examples of low color dispersion materials are acrylic and Zeonex®. An example of a high color dispersion material is polystyrene. Other low and high color dispersion materials may of course be used in the practice of this invention. In a preferred embodiment, the third lens group 133 includes one lens which is comprised of a low color dispersion material, and another lens which is comprised of a high color dispersion material. The individual lenses which comprises the third lens group 133 are illustrated in detail in FIGS. 6–10. The third lens group 133 may comprise at least one rotationally symmetric surface and the lenses comprising the third lens group 133 are comprised of either glass or plastic or a combination of glass and plastic. The third lens group 133 may comprise at least one surface of the spherical, aspherical, diffractive, or Fresnel type, or a combination of these surface types. Also, the third lens group 133 may comprise at least one lens which is tilted and decentered with respect to a central longitudinal optical axis of the lenses which comprise the imaging element 120. Preferably, the third lens group 133 consists of lenses which are all tilted and decentered with respect to the central longitudinal optical axis of the lenses which comprise the imaging element 120.

The various lenses within each lens group and the imaging element 120 may each be tilted or de-centered with respect to the central longitudinal optical axis 101 (FIG. 4) of the optical system 100 dependent on the amount or type of correction desired. These adjustments to the individual component groups (i.e. tilting and de-centering) may be determined through routine experimentation and may therefore become apparent to the skilled artisan in light of the present disclosure. Each of the lenses may be arranged or adjusted independently from the other remaining elements of the optical system 100. For example, the arrangement or adjustment may require the second lens group 132 to have a positive tilt with respect to the central longitudinal optical axis 101 of the optical system 100, while the first lens group 131 and third lens group 133 each have a negative tilt with respect to the central longitudinal optical axis 101 of the optical system 100. Other configurations will, or course, fall within the scope of the present invention in light of this description. Alternatively, the exact number of lenses within each lens group of the anamorphic telescope 130 may be dependent on the overall configuration of the optical system (including the above-mentioned tilting and chromatic aberration correction), the value for incident angle θ, the magnification desired, and the image quality desired.

By utilizing a significant amount of tilt and/or decentration within the first lens group 131, substantial correction of keystone distortion occurs. Some or all of the lenses within the imaging element 120, second lens group 132, and the third lens group 133 may also contribute to keystone correction although preferably to a lesser degree than that provided by lenses within the first lens group 131.

The final mirror 140 in the optical system 100 is used mainly to reflect the image toward the display image plane and is positioned subsequent the third lens group 133 within the optical path of the image. The final mirror 140 preferably comprises a biconic surface which is independently anamorphic and conic in a first direction and in a second direction which is perpendicular to the first direction. In a preferred embodiment, the final mirror 140 has positive power and is preferably configured to reflect light rays which are non-parallel with respect to each other between the final mirror and the display image plane. Since keystone distortion correction occurs in the lenses as described above (and mainly occurs in the first lens group 131 which preferably has the greatest tilt), keystone distortion is corrected without resorting to parallel rays. The other lenses throughout the optical system 100 assist in the correction of keystone distortion to effect a gradual and therefore, more gentle correction than if it were performed by a single element. It may be alternatively desired to configure the final mirror 140 such that light rays between the final mirror and the display image plane are parallel with respect to each other. Thus, in this particular configuration, principal light rays reflecting off the final mirror 140 of this type (i.e. having parallel rays being reflected therefrom) do not further separate (i.e. not conical in shape) and thus, this configuration results in the image source appearing to come from an infinite distance. In either configuration, the final mirror 140 may optionally be configured to assist in the reduction or elimination of keystone distortion. Also, if desired, the final mirror 140 may optionally be used to introduce a tilt on the image of the object (as mentioned above) and may also optionally be used to focus the image. Further, the final mirror 140 may alternatively comprise a spherical, aspherical, Fresnel, planar, or diffractive surface, or combinations thereof. The center of curvature of the imaging element 120, the anamorphic telescope 130, and the final mirror 140 are each preferably aligned within a common plane. Also, one or two elements selected from the imaging element 120, the anamorphic telescope 130, and the final mirror 140 effect a tilt on the image. More preferably, it is desired to have the imaging element 120, the anamorphic telescope 130, and the final mirror 140 each effect a tilt on the image. Optionally, the final mirror 140 may be replaced by a transmissive element or by a combined transmissive/reflective element. It may alternatively be possible to omit the final mirror 140.

As an alternative to providing the keystone correction with the lenses within the imaging element 120 or within the three groups comprising the anamorphic telescope 130, the reduction or elimination of the keystone-type distortion may be performed electronically. For example, image source 110 may be a DMD configured to produce an image having an "inverse keystone-type distortion" which compensates for the keystone-type distortion caused by the optics of the projection path. Of course, this distortion correction technique can be used to compensate for any other distortion correction or focusing elements provided in the optical system. Although this technique has been described with reference to a DMD modulator, other modulators such as a raster scanner or an LCD may be used.

Figure 6:
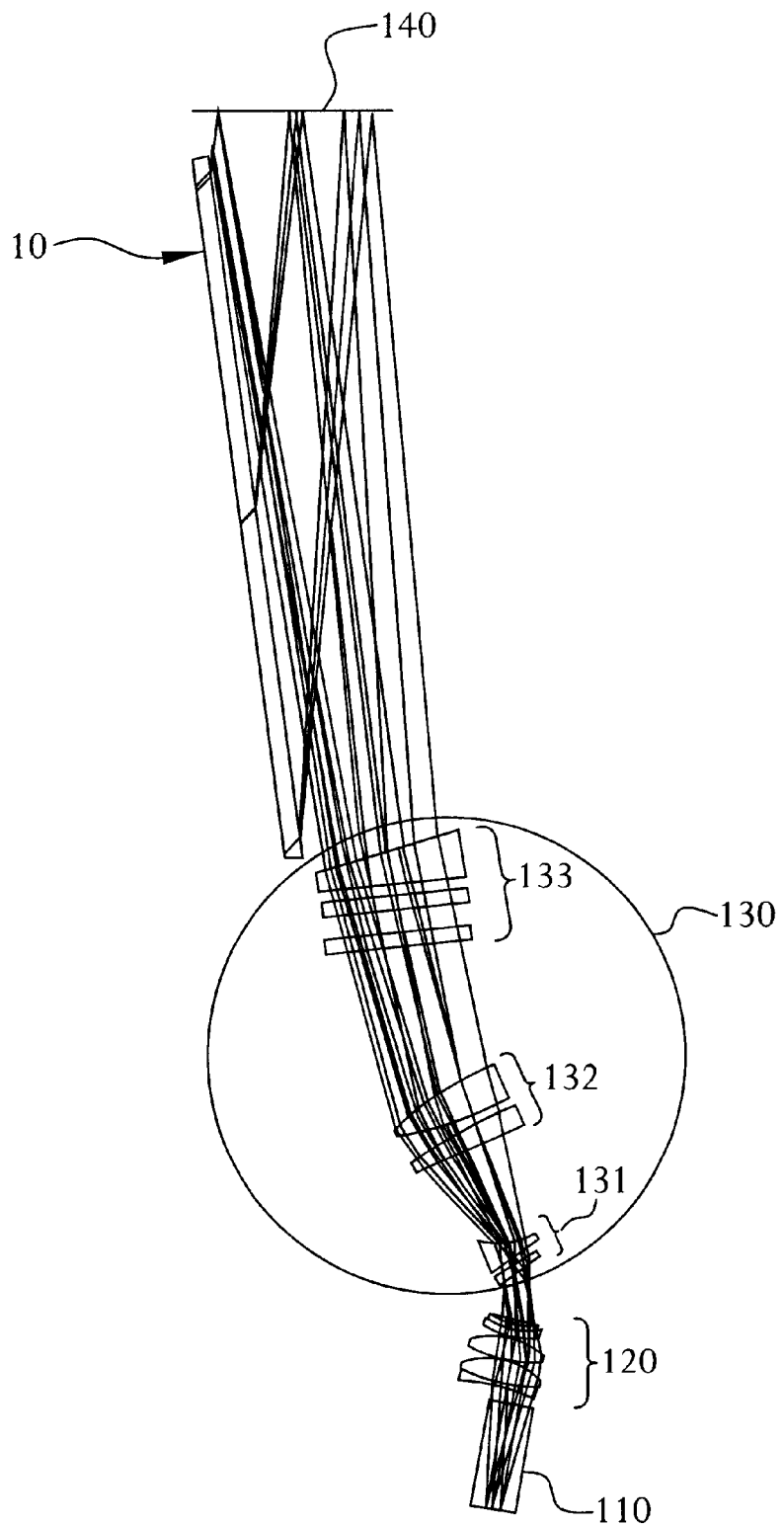
FIG. 6 is a detailed side view illustrating lens elements in the preferred optical system of the type generally depicted in FIG. 5 in conjunction with an optical panel.

FIG. 5 is a side view schematic of an ultrathin optical panel 10 using a preferred optical system 100 of the type shown in FIG. 4. FIG. 6 is a detailed side view illustrating particular lens elements in the preferred optical system of the type generally depicted in FIG. 5 in conjunction with an optical panel. Commonly available optical design software such as, for example, ZEMAX, version 9.0 (Focus Software, Inc.) may be used to assist in describing the various characteristics (e.g. radius, thickness, glass type, diameter, and whether the surface is conic) corresponding to each surface region of each individual element/group within the optical system 100. In the exemplary configuration shown in FIGS. 6–7, the ZEMAX software outputs surface data describing these surface characteristics as illustrated in Table 1. The surface data for surfaces #OBJ-#3 (illustrated in the left-hand colunm of Table 1) correspond to the image source 110. The surface data for surfaces #6–#15, #24–#27, #30–#33, and #36–#41 correspond to the imaging element 120, the first lens group 131, the second lens group 132, and the third lens group 133, respectively. The surface data for surface #44 correspond to the final mirror 140. The surface data for surfaces #48-#IMA correspond to a model of the panel 10. The specific nomenclature representing the shapes, compositions, and definitions of the elements as presented in Table 1 follow standards as set forth in the ZEMAX manual.

Of course, other surface data values for each individual element/group will become apparent to those of ordinary skill in the art in light of the present disclosure and may therefore be determined through routine experimentation dependent on the overall configuration and positioning of the individual elements/groups within the optical system 100 (including the above-mentioned tilting), the value for incident angle θ, and the quality of the image desired.

TABLE 1

ZEMAX Software Output Describing Surface Data Summary and Detail for Each Individual Element within the Optical System 100

SURFACE DATA SUMMARY

| Surf | Type | Radius | Thickness | Glass | Diameter | Conic |
|---|---|---|---|---|---|---|
| OBJ | STANDARD | Infinity | 10000 | | 19.94653 | 0 |
| STO | STANDARD | Infinity | −10000 | | 3554.857 | 0 |
| 2 | STANDARD | Infinity | 90 | SFL57 | 19.94653 | 0 |
| 3 | STANDARD | Infinity | 0 | | 37.08317 | 0 |
| 4 | COORDBRK | — | 13 | | — | — |
| 5 | COORDBRK | — | 0 | | — | — |
| 6 | STANDARD | −193.9193 | 3 | POLYSTYR | 62.24857 | 0 |
| 7 | EVENASPH | 77.12215 | 1.5 | | 64.52058 | 0 |
| 8 | STANDARD | 218.4338 | 19 | ZEON480R | 64.74043 | 0 |

TABLE 1-continued

ZEMAX Software Output Describing Surface Data Summary and Detail for Each Individual Element within the Optical System 100

| | | | | | | |
|---|---|---|---|---|---|---|
| 9 | EVENASPH | −52.84822 | 0.5 | | 66.36415 | 0 |
| 10 | EVENASPH | 49.08624 | 18.5 | ZEON480R | 62.70585 | 0 |
| 11 | EVENASPH | −67.60375 | 2.481307 | | 61.4723 | 0 |
| 12 | EVENASPH | 74.80689 | 4 | POLYSTYR | 46.89625 | 0 |
| 13 | STANDARD | 40.09159 | 1.066642 | | 41.29904 | 0 |
| 14 | EVENASPH | 60.42716 | 5 | ZEON480R | 41.10136 | 0 |
| 15 | STANDARD | 47.51392 | 4.344381 | | 37.44564 | 0 |
| 16 | STANDARD | Infinity | −59.39233 | | 36.96545 | 0 |
| 17 | COORDBRK | — | 69.39233 | | — | — |
| 18 | COORDBRK | — | 45 | | — | — |
| 19 | COORDBRK | — | 2 | | — | — |
| 20 | COORDBRK | — | 0 | | — | — |
| 21 | TOROIDAL | Infinity | 0 | | 0 | 0 |
| 22 | COORDBRK | — | −2 | | — | — |
| 23 | COORDBRK | — | 0 | | — | — |
| 24 | BICONICX | Infinity | 4.5 | ACRYLIC | 105.1232 | 0 |
| 25 | EVENASPH | 350.0003 | 7.5 | | 99.38359 | 0 |
| 26 | BICONICX | Infinity | 4.5 | POLYSTYR | 94.47566 | 0 |
| 27 | EVENASPH | 83.47696 | −16.5 | | 82.78123 | 0 |
| 28 | COORDBRK | — | 100 | | — | — |
| 29 | COORDBRK | — | 0 | | — | — |
| 30 | BICONICX | Infinity | 17 | POLYSTYR | 152.1916 | 0 |
| 31 | EVENASPH | −498.0031 | 7.5 | | 154.9292 | 0 |
| 32 | BICONICX | 328.9291 | 32 | ACRYLIC | 161.8571 | 0 |
| 33 | EVENASPH | −211.3969 | −56.5 | | 162.2234 | 0 |
| 34 | COORDBRK | — | 175 | | — | — |
| 35 | COORDBRK | — | 0 | | — | — |
| 36 | BICONICX | Infinity | 11.875 | ACRYLIC | 534.5 | 0 |
| 37 | BICONICX | Infinity | 20 | | 532.8953 | 0 |
| 38 | BICONICX | Infinity | 11.875 | ACRYLIC | 528.8599 | 0 |
| 39 | BICONICX | Infinity | 10 | | 527.2552 | 0 |
| 40 | BICONICX | Infinity | −5 | POLYSTYR | 525.2375 | 0 |
| 41 | EVENASPH | 400 | −48.75 | | 520.4943 | 0 |
| 42 | COORDBRK | — | 708.75 | | — | — |
| 43 | COORDBRK | — | 0 | | — | — |
| 44 | BICONICX | −6038.072 | 0 | MIRROR | 716.4895 | 153.1398 |
| 45 | COORDBRK | — | −340 | | — | — |
| 46 | COORDBRK | — | 0 | | — | — |
| 47 | COORDBRK | — | 0 | | — | — |
| 48 | STANDARD | Infinity | −12.7 | ACRYLIC | 918.3966 | 0 |
| IMA | STANDARD | Infinity | | BK7 | 933.8467 | 0 |

SURFACE DATA DETAIL

| | |
|---|---|
| Surface OBJ | STANDARD |
| Scattering | None |
| Surface STO | STANDARD |
| Scattering | None |
| Surface 2 | STANDARD |
| Scattering | None |
| Surface 3 | STANDARD |
| Scattering | None |
| Surface 4 | COORDBRK |
| Decenter X | 0 |
| Decenter Y | 10.229896 |
| Tilt About X | −17.916146 |
| Tilt About Y | 0 |
| Tilt About Z | 0 |
| Order | Decenter then tilt |
| Scattering | None |
| Surface 5 | COORDBRK |
| Decenter X | 0 |
| Decenter Y | 0 |
| Tilt About X | 21.963548 |
| Tilt About Y | 0 |
| Tilt About Z | 0 |
| Order | Decenter then tilt |
| Scattering | None |
| Surface 6 | STANDARD |
| Scattering | None |
| Surface 7 | EVENASPH |
| Coeff on r 2 | 0 |
| Coeff on r 4 | −7.6365947e−006 |
| Coeff on r 6 | 8.2389495e−009 |
| Coeff on r 8 | −6.4927098e−012 |
| Coeff on r 10 | 3.8564522e−015 |

TABLE 1-continued

ZEMAX Software Output Describing Surface Data Summary and Detail for Each Individual Element within the Optical System 100

| | |
|---|---|
| Coeff on r 12 | −1.4897253e−018 |
| Coeff on r 14 | 1.9404697e−022 |
| Coeff on r 16 | 0 |
| Scattering | None |
| Surface 8 | STANDARD |
| Scattering | None |
| Surface 9 | EVENASPH |
| Coeff on r 2 | 0 |
| Coeff on r 4 | 1.1540499e−006 |
| Coeff on r 6 | −6.5212774e−010 |
| Coeff on r 8 | 4.1919239e−013 |
| Coeff on r 10 | 5.8009771e−017 |
| Coeff on r 12 | −2.3798683e−019 |
| Coeff on r 14 | 1.8552364e−022 |
| Coeff on r 16 | 0 |
| Scattering | None |
| Surface 10 | EVENASPH |
| Coeff on r 2 | 0 |
| Coeff on r 4 | −6.6616345e−006 |
| Coeff on r 6 | −2.9177847e−009 |
| Coeff on r 8 | 4.0710706e−012 |
| Coeff on r 10 | −1.3118453e−015 |
| Coeff on r 12 | 0 |
| Coeff on r 14 | 0 |
| Coeff on r 16 | 0 |
| Scattering | None |
| Surface 11 | EVENASPH |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Scattering | None |
| Surface 12 | EVENASPH |
| Coeff on r 2 | 0 |
| Coeff on r 4 | −2.3046574e−006 |
| Coeff on r 6 | 4.9958897e−009 |
| Coeff on r 8 | 7.7451265e−013 |
| Coeff on r 10 | −1.9299055e−015 |
| Coeff on r 12 | 0 |
| Coeff on r 14 | 0 |
| Coeff on r 16 | 0 |
| Scattering | None |
| Surface 13 | STANDARD |
| Scattering | None |
| Surface 14 | EVENASPH |
| Coeff on r 2 | 0 |
| Coeff on r 4 | 8.7986807e−006 |
| Coeff on r 6 | −2.2204077e−009 |
| Coeff on r 8 | −3.1936648e−012 |
| Coeff on r 10 | 0 |
| Coeff on r 12 | 0 |
| Coeff on r 14 | 0 |
| Coeff on r 16 | 0 |
| Scattering | None |
| Surface 15 | STANDARD |
| Scattering | None |
| Surface 16 | STANDARD |
| Scattering | None |
| Surface 17 | COORDBRK |
| Decenter X | 0 |
| Decenter Y | 0 |
| Tilt About X | −21.963548 |
| Tilt About Y | 0 |
| Tilt About Z | 0 |
| Order | Tilt then decenter |
| Scattering | None |
| Surface 18 | COORDBRK |
| Decenter X | 0 |
| Decenter Y | 0 |
| Tilt About X | 0 |
| Tilt About Y | 0 |
| Tilt About Z | 0 |

TABLE 1-continued

ZEMAX Software Output Describing Surface Data Summary and Detail for Each Individual Element within the Optical System 100

| | |
|---|---|
| Order | Decenter then tilt |
| Scattering | None |
| Surface 19 | COORDBRK |
| Decenter X | 0 |
| Decenter Y | 0 |
| Tilt About X | 0 |
| Tilt About Y | 0 |
| Tilt About Z | 0 |
| Order | Decenter then tilt |
| Scattering | None |
| Surface 20 | COORDBRK |
| Decenter X | 0 |
| Decenter Y | 0 |
| Tilt About X | 55 |
| Tilt About Y | 0 |
| Tilt About Z | 0 |
| Order | Decenter then tilt |
| Scattering | None |
| Surface 21 | TOROIDAL |
| Rad of rev. | 0 |
| Coeff on $y^2$ | 0 |
| Coeff on $y^4$ | 0 |
| Coeff on $y^6$ | 0 |
| Coeff on $y^8$ | 0 |
| Coeff on $y^{10}$ | 0 |
| Coeff on $y^{12}$ | 0 |
| Coeff on $y^{14}$ | 0 |
| Scattering | None |
| Surface 22 | COORDBRK |
| Decenter X | 0 |
| Decenter Y | 0 |
| Tilt About X | −55 |
| Tilt About Y | 0 |
| Tilt About Z | 0 |
| Order | Decenter then tilt |
| Scattering | None |
| Surface 23 | COORDBRK |
| Decenter X | 0 |
| Decenter Y | −66.296228 |
| Tilt About X | −30 |
| Tilt About Y | 0 |
| Tilt About Z | 0 |
| Order | Decenter then tilt |
| Scattering | None |
| Surface 24 | BICONICX |
| X Radius | −387.32209 |
| X Conic | −267.03867 |
| Aperture | Rectangular Aperture |
| X Half Width | 15 |
| Y Half Width | 20 |
| Y- Decenter | 37.5 |
| Scattering | None |
| Surface 25 | EVENASPH |
| Coeff on r 2 | 0 |
| Coeff on r 4 | −2.8438997e−007 |
| Coeff on r 6 | 1.4417908e−010 |
| Coeff on r 8 | −4.3731403e−014 |
| Coeff on r 10 | 5.1611474e−018 |
| Coeff on r 12 | 0 |
| Coeff on r 14 | 0 |
| Coeff on r 16 | 0 |
| Aperture | Rectangular Aperture |
| X Half Width | 15 |
| Y Half Width | 20 |
| Y- Decenter | 37.5 |
| Scattering | None |
| Surface 26 | BICONICX |
| X Radius | 127.25182 |
| X Conic | −0.73067967 |
| Aperture | Rectangular Aperture |
| X Half Width | 15 |
| Y Half Width | 20 |
| Y- Decenter | 30 |
| Scattering | None |
| Surface 27 | EVENASPH |
| Coeff on r 2 | 0 |

TABLE 1-continued

ZEMAX Software Output Describing Surface Data Summary and Detail for Each Individual Element within the Optical System 100

| | |
|---|---:|
| Coeff on r 4 | 1.7830073e−006 |
| Coeff on r 6 | −6.8248748e−010 |
| Coeff on r 8 | 3.5235297e−013 |
| Coeff on r 10 | −6.940471e−017 |
| Coeff on r 12 | 0 |
| Coeff on r 14 | 0 |
| Coeff on r 16 | 0 |
| Aperture | Rectangular Aperture |
| X Half Width | 15 |
| Y Half Width | 20 |
| Y- Decenter | 30 |
| Scattering | None |
| Surface 28 | COORDBRK |
| Decenter X | 0 |
| Decenter Y | 66.296228 |
| Tilt About X | 30 |
| Tilt About Y | 0 |
| Tilt About Z | 0 |
| Order | Tilt then decenter |
| Scattering | None |
| Surface 29 | COORDBRK |
| Decenter X | 0 |
| Decenter Y | −40.738965 |
| Tilt About X | −17.109512 |
| Tilt About Y | 0 |
| Tilt About Z | 0 |
| Order | Decenter then tilt |
| Scattering | None |
| Surface 30 | BICONICX |
| X Radius | 183.73015 |
| X Conic | −0.43100708 |
| Aperture | Rectangular Aperture |
| X Half Width | 40 |
| Y Half Width | 50 |
| Y- Decenter | 35 |
| Scattering | None |
| Surface 31 | EVENASPH |
| Coeff on r 2 | 0 |
| Coeff on r 4 | −2.3071702e−008 |
| Coeff on r 6 | 1.8940836e−012 |
| Coeff on r 8 | −1.5192564e−016 |
| Coeff on r 10 | 0 |
| Coeff on r 12 | 0 |
| Coeff on r 14 | 0 |
| Coeff on r 16 | 0 |
| Aperture | Rectangular Aperture |
| X Half Width | 40 |
| Y Half Width | 50 |
| Y- Decenter | 35 |
| Scattering | None |
| Surface 32 | BICONICX |
| X Radius | 0 |
| X Conic | 0 |
| Aperture | Rectangular Aperture |
| X Half Width | 40 |
| Y Half Width | 50 |
| Y- Decenter | 35 |
| Scattering | None |
| Surface 33 | EVENASPH |
| Coeff on r 2 | 0 |
| Coeff on r 4 | 2.6979e−009 |
| Coeff on r 6 | −2.7244033e−014 |
| Coeff on r 8 | 8.9679739e−017 |
| Coeff on r 10 | 0 |
| Coeff on r 12 | 0 |
| Coeff on r 14 | 0 |
| Coeff on r 16 | 0 |
| Aperture | Rectangular Aperture |
| X Half Width | 40 |
| Y Half Width | 50 |
| Y- Decenter | 35 |
| Scattering | None |
| Surface 34 | COORDBRK |
| Decenter X | 0 |
| Decenter Y | 40.738965 |
| Tilt About X | 17.109512 |

TABLE 1-continued

ZEMAX Software Output Describing Surface Data Summary and Detail for Each Individual Element within the Optical System 100

| | |
|---|---:|
| Tilt About Y | 0 |
| Tilt About Z | 0 |
| Order | Tilt then decenter |
| Scattering | None |
| Surface 35 | COORDBRK |
| Decenter X | 0 |
| Decenter Y | 240.74828 |
| Tilt About X | 1.8789527 |
| Tilt About Y | 0 |
| Tilt About Z | 0 |
| Order | Decenter then tilt |
| Scattering | None |
| Surface 36 | BICONICX |
| X Radius | −52.407587 |
| X Conic | −1.0669935 |
| Aperture | Rectangular Aperture |
| X Half Width | 40 |
| Y Half Width | 60 |
| Y- Decenter | −215 |
| Scattering | None |
| Surface 37 | BICONICX |
| X Radius | 360.14619 |
| X Conic | 0 |
| Aperture | Rectangular Aperture |
| X Half Width | 60 |
| Y Half Width | 60 |
| Y- Decenter | −215 |
| Scattering | None |
| Surface 38 | BICONICX |
| X Radius | −52.407587 |
| X Conic | −1.0669935 |
| Aperture | Rectangular Aperture |
| X Half Width | 40 |
| Y Half Width | 60 |
| Y- Decenter | −215 |
| Scattering | None |
| Surface 39 | BICONICX |
| X Radius | 360.14619 |
| X Conic | 0 |
| Aperture | Rectangular Aperture |
| X Half Width | 60 |
| Y Half Width | 60 |
| Y- Decenter | −215 |
| Scattering | None |
| Surface 40 | BICONICX |
| X Radius | 111.4054 |
| X Conic | −8.322084 |
| Aperture | Rectangular Aperture |
| X Half Width | 70 |
| Y Half Width | 60 |
| Y- Decenter | −215 |
| Scattering | None |
| Surface 41 | EVENASPH |
| Coeff on r 2 | 0 |
| Coeff on r 4 | −2.1490064e−008 |
| Coeff on r 6 | 2.3665096e−013 |
| Coeff on r 8 | −1.7247128e−018 |
| Coeff on r 10 | 5.2496812e−024 |
| Coeff on r 12 | 0 |
| Coeff on r 14 | 0 |
| Coeff on r 16 | 0 |
| Aperture | Rectangular Aperture |
| X Half Width | 80 |
| Y Half Width | 60 |
| Y- Decenter | −215 |
| Scattering | None |
| Surface 42 | COORDBRK |
| Decenter X | 0 |
| Decenter Y | −240.74828 |
| Tilt About X | −1.8789527 |
| Tilt About Y | 0 |
| Tilt About Z | 0 |
| Order | Tilt then decenter |
| Scattering | None |
| Surface 43 | COORDBRK |
| Decenter X | 0 |

TABLE 1-continued

ZEMAX Software Output Describing Surface Data Summary and Detail for Each Individual Element within the Optical System 100

| | |
|---|---:|
| Decenter Y | 132.5782 |
| Tilt About X | 6.5 |
| Tilt About Y | 0 |
| Tilt About Z | 0 |
| Order | Tilt then decenter |
| Scattering | None |
| Surface 44 | BICONICX |
| X Radius | −1988.3354 |
| X Conic | −5.5500196 |
| Aperture | Rectangular Aperture |
| X Half Width | 360 |
| Y Half Width | 80 |
| Y- Decenter | −120 |
| Scattering | None |
| Surface 45 | COORDBRK |
| Decenter X | 0 |
| Decenter Y | −132.5782 |
| Tilt About X | 6.5 |
| Tilt About Y | 0 |
| Tilt About Z | 0 |
| Order | Decenter then tilt |
| Scattering | None |
| Surface 46 | COORDBRK |
| Decenter X | 0 |
| Decenter Y | 12.127182 |
| Tilt About X | 78 |
| Tilt About Y | 0 |
| Tilt About Z | 0 |
| Order | Decenter then tilt |
| Scattering | None |
| Surface 47 | COORDBRK |
| Decenter X | 0 |
| Decenter Y | 0 |
| Tilt About X | 0 |
| Tilt About Y | 0 |
| Tilt About Z | 0 |
| Order | Decenter then tilt |
| Scattering | None |
| Surface 48 | STANDARD |
| Aperture | Rectangular Aperture |
| X Half Width | 360 |
| Y Half Width | 300 |
| Scattering | None |
| Surface IMA | STANDARD |
| Aperture | Rectangular Aperture |
| X Half Width | 360 |
| Y Half Width | 300 |
| Scattering | None |

Figure 11:
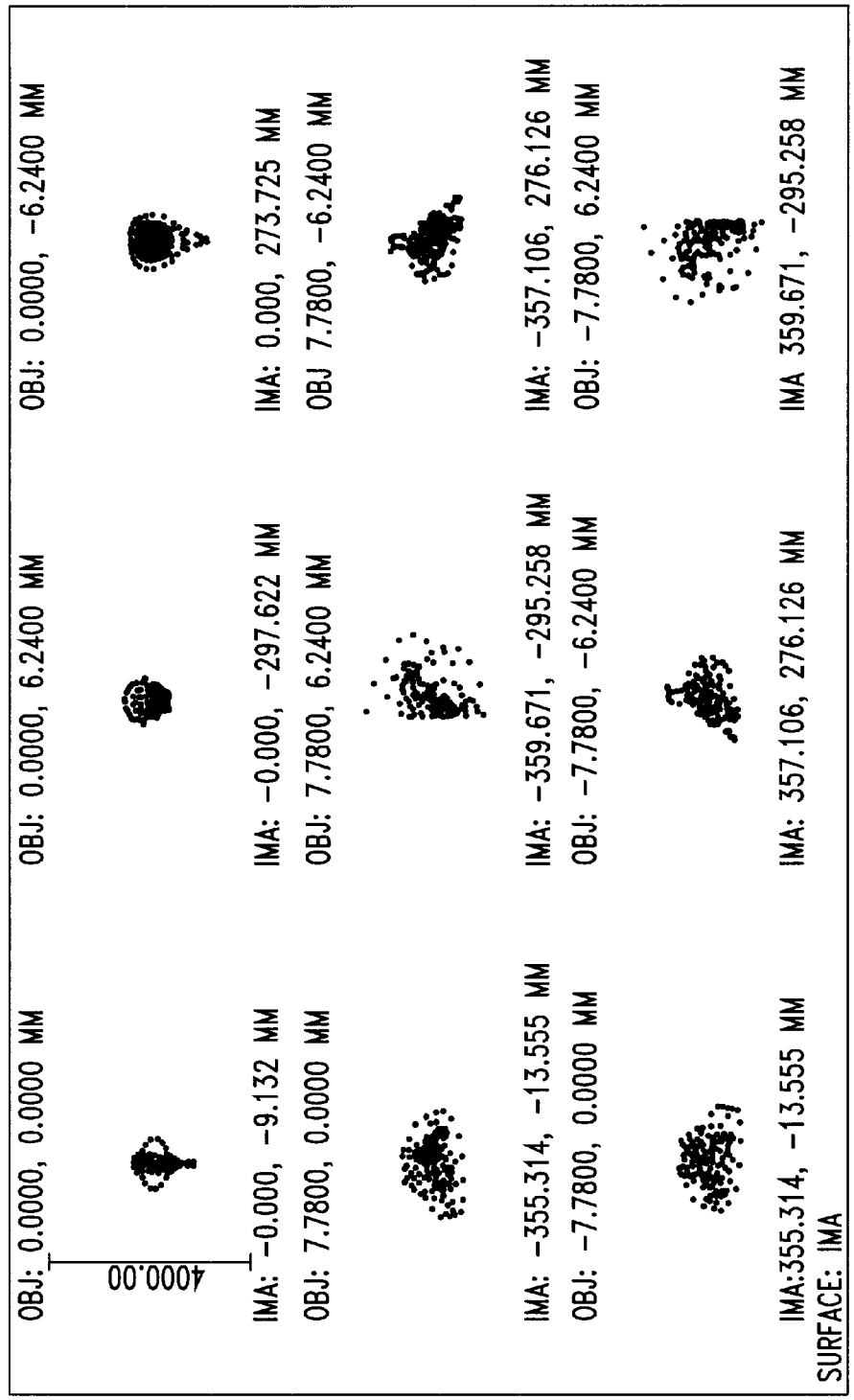
FIG. 11 is a spot diagram illustrating image focusing performance using a preferred optical system and an optical panel.
Figure 12:
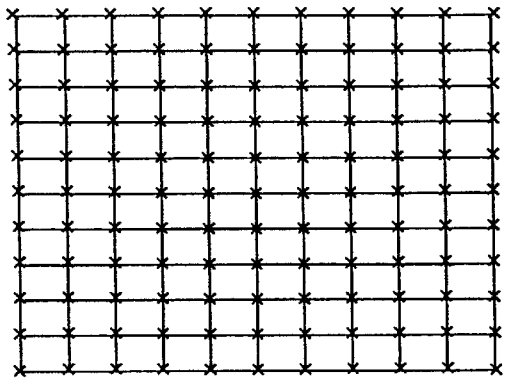
FIG. 12 is a grid distortion plot diagram illustrating image distortion using a preferred optical system and an optical panel.

The optical system 100 and panel 10 as described above produces a distortion free image which corrects chromatic aberration of the image. This optical system 100 also produces a properly focused image on the surface of the outlet face 24 of the optical panel 10 as illustrated by the spot diagram of FIG. 11. FIG. 11 illustrates the image focusing performance of the optical system 100 using geometric image spots projected at various locations of the optical panel 10. The optical system 100 also retains the aspect ratio of the original image source while maintaining a linear point-to-point mapping of the image having distortion of less than 2% as illustrated by the grid distortion plot diagram of FIG. 12. FIG. 12 is a grid distortion plot diagram wherein intersections of the grid show the ideal image locations and the "x's" show the actual image locations. The grid is for a 12.48 mm×15.56 mm image source. The grid distortion plot diagram depicts the outlet face 24 surface #IMA when an image with a grid or lattice pattern is placed at the image source 110 surface #OBJ. The lenses used in optical system 100 of the present invention are preferably non-planar and plastic and therefore result in easier manufacturability during the molding process. Moreover, significantly higher resolutions may be obtained using the optical system 100 of the present invention due to the reduction in the various distortions and chromatic aberrations mentioned above. The multiple lenses required by the color correction scheme described above assist in adding a significant amount of minor tilts throughout the system that gradually correct the keystone distortion in a more gentle fashion than if the correction were performed using a single element.

Figure 8:
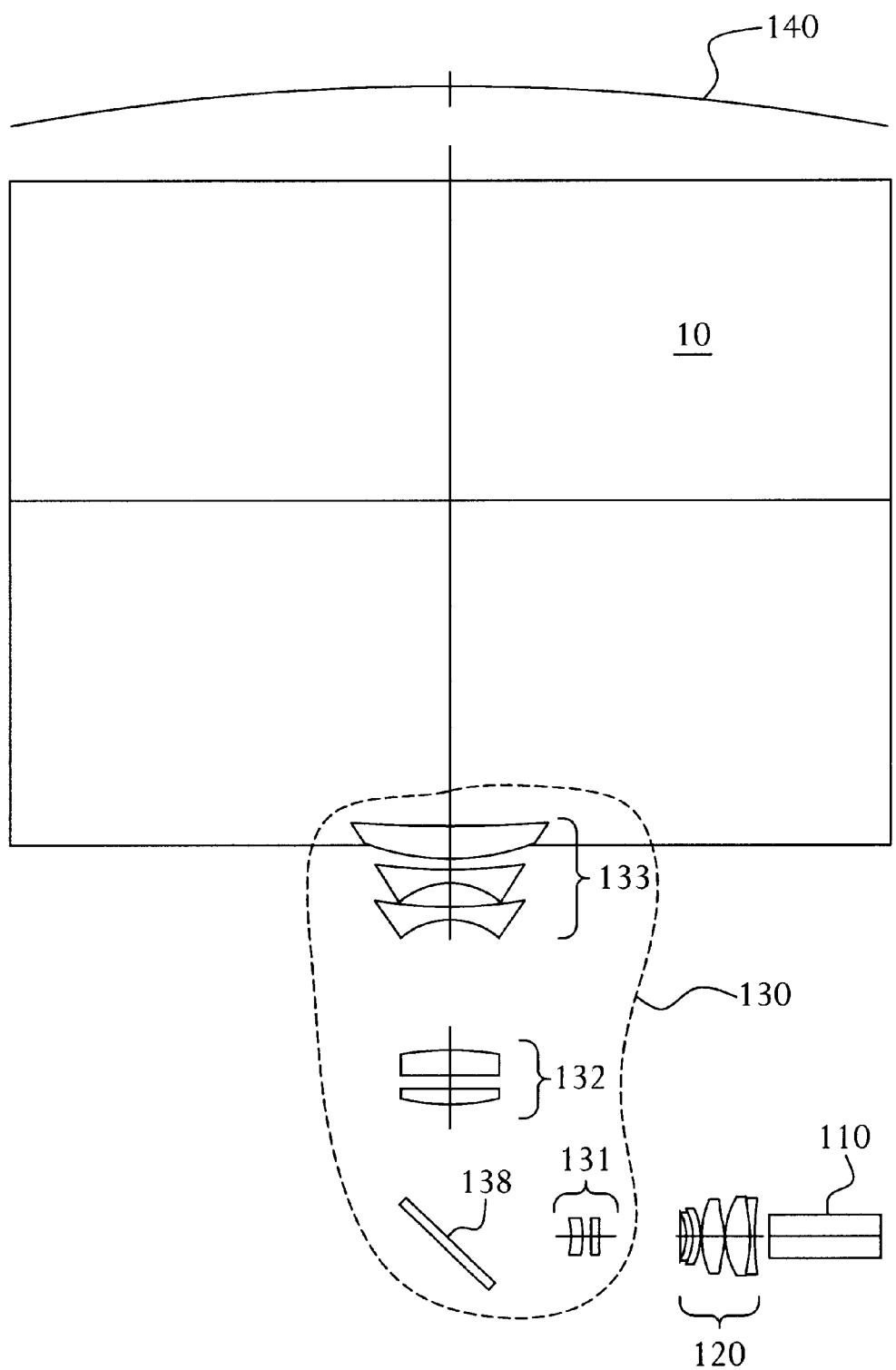
FIG. 8 is a detailed rear view illustrating lens elements and a folding mirror in an alternate optical system in conjunction with an optical panel.
Figure 9:
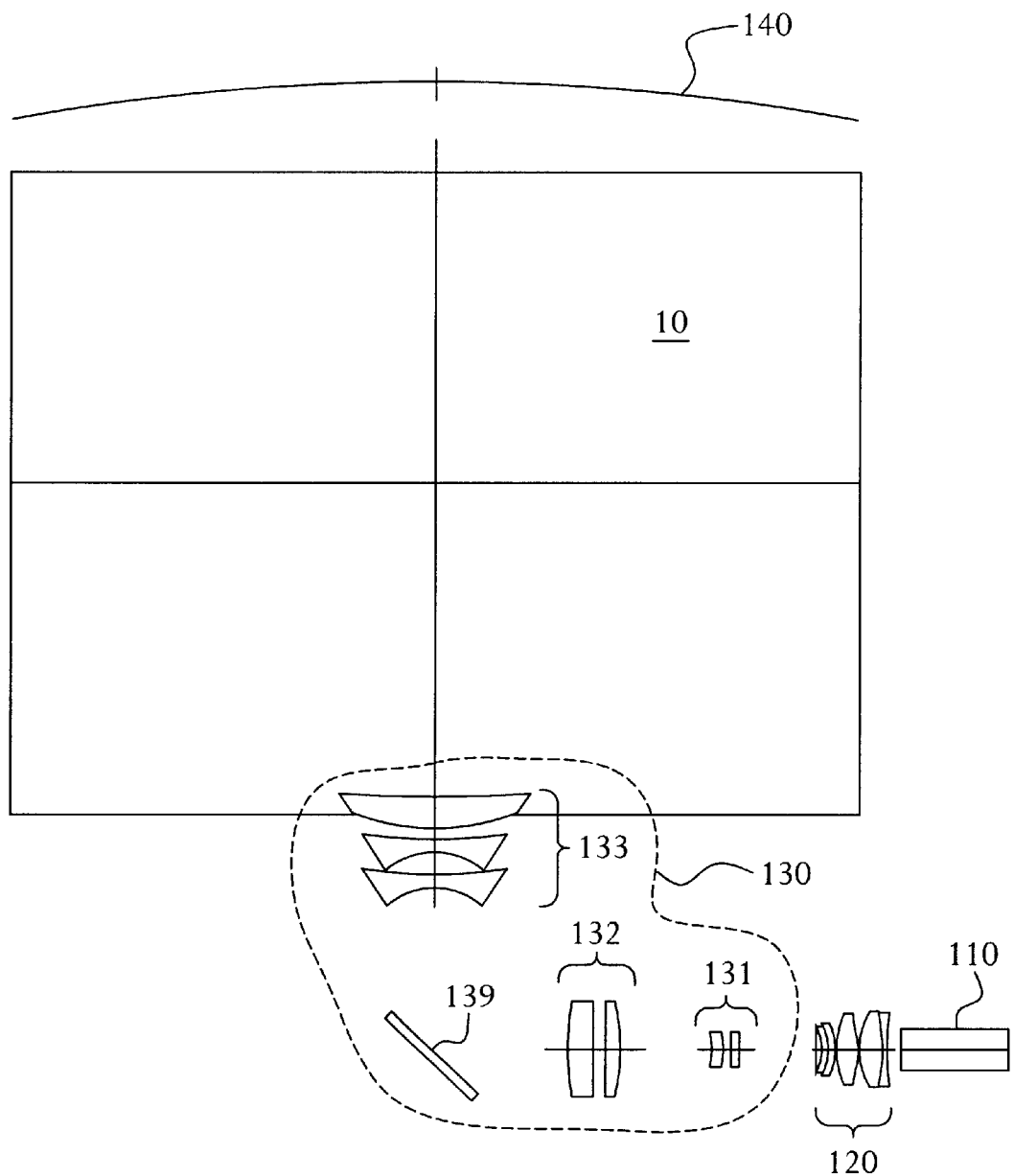
FIG. 9 is a detailed rear view illustrating lens elements and a folding mirror in another alternate optical system in conjunction with an optical panel.
Figure 10:
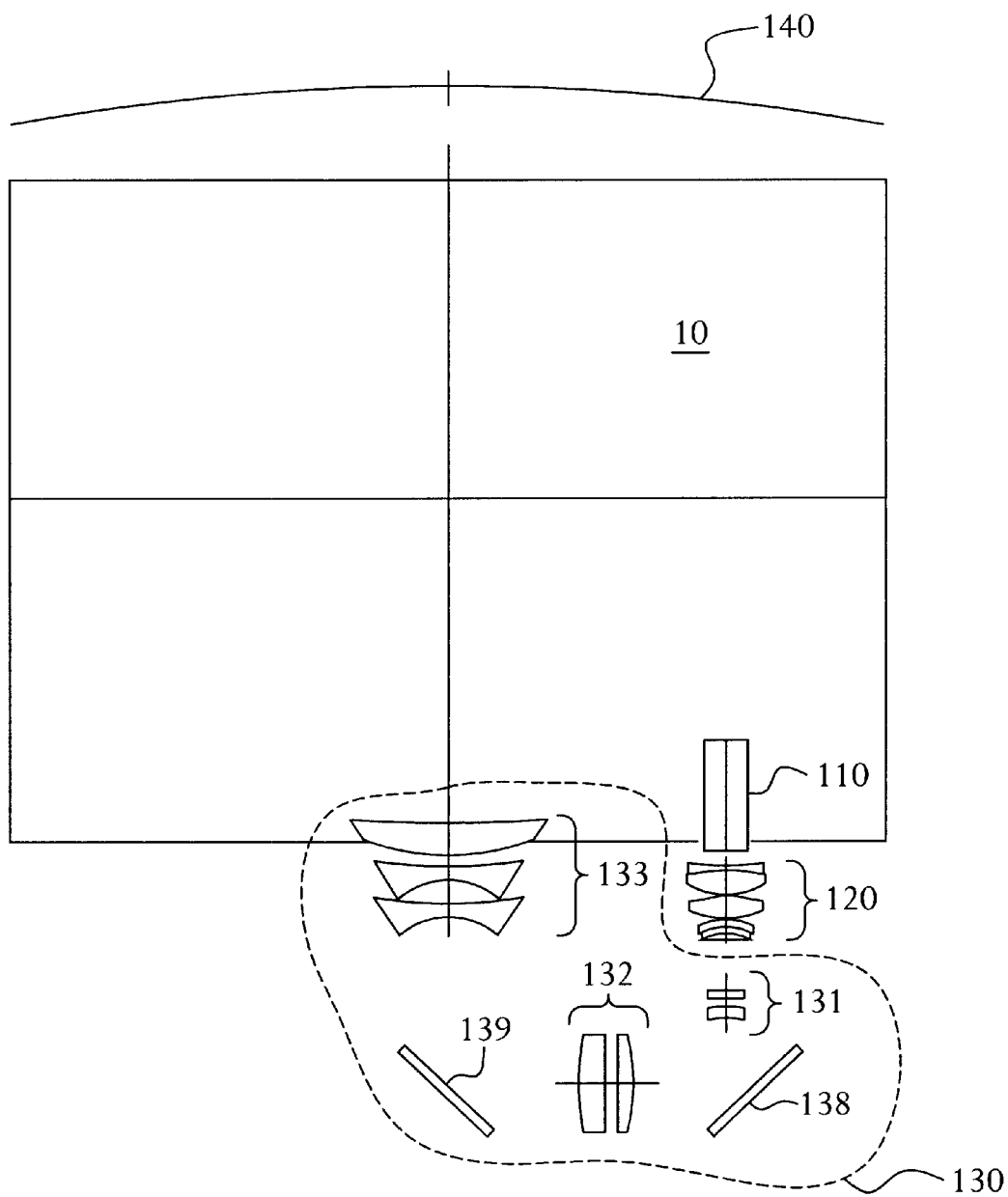
FIG. 10 is a detailed rear view illustrating lens elements and two folding mirrors in a further alternate optical system in conjunction with an optical panel.

In another preferred embodiment, it may be desired to effect a fold or multiple folds in the optical path of the optical system 100 within the anamorphic telescope 130 to thereby reduce the overall height, width, and depth D of the housing 14 containing the optical panel 10 and optical system 100. FIG. 8 is a detailed rear view illustrating lens elements and a folding mirror in an alternate optical system in conjunction with an optical panel. The folding mirror 138 in this configuration is positioned between the first lens group 131 and the second lens group 132. In yet another preferred embodiment, FIG. 9 is a detailed rear view illustrating lens elements and a folding mirror in an alternate optical system in conjunction with an optical panel. The folding mirror 139 in this configuration is positioned between the second lens group 132 and the third lens group 133. In still yet another preferred embodiment, FIG. 10 is a detailed rear view illustrating lens elements and two folding mirrors in an alternate optical system in conjunction with an optical panel. The folding mirror 138 in this configuration is positioned between the first lens group 131 and the second lens group 132, while the folding mirror 139 is positioned between the second lens group 132 and the third lens group 133. By providing folding of the optical path within the first and second anamorphic telescopic systems, image distortion (e.g. chromatic aberration) is reduced, while reducing the required housing 14 size. Optionally, in another alternate optical system configuration, a folding mirror may be provided between the imaging element 120 and the first lens group 131. This particular folding mirror may be the only folding mirror within the optical system 100 or may be used in any combination with folding mirror 138 and/or folding mirror 139.

Figure 7:
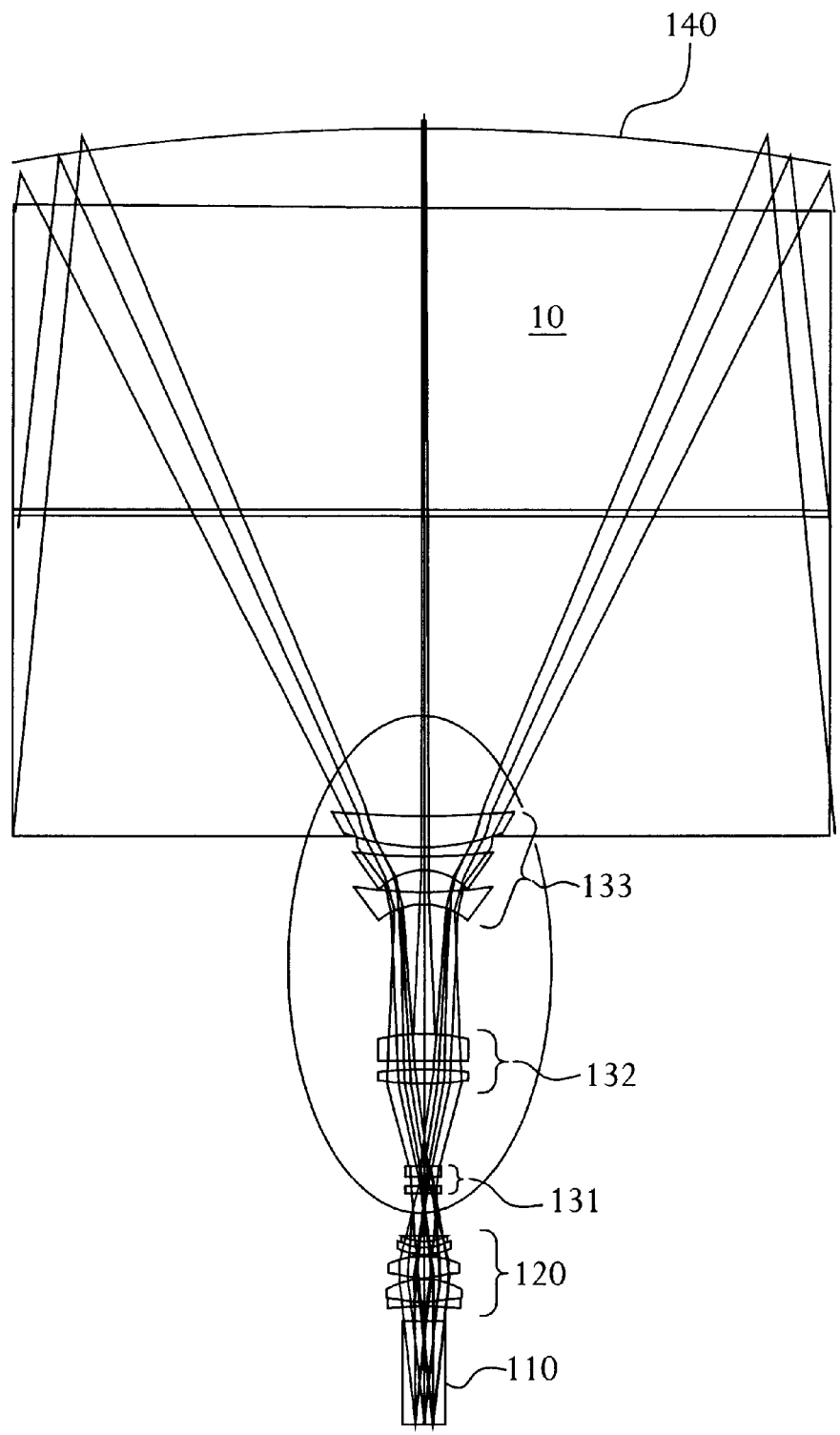
FIG. 7 is a detailed rear view illustrating the lens elements in the preferred optical system of the type generally depicted in FIG. 5 in conjunction with an optical panel.

Those of ordinary skill in the art will recognize that many modifications and variations of the present invention may be implemented. For example, instead of comprising lenses, the imaging element 120 and lens groups which comprise the anamorphic telescope 130 each may alternatively comprise additional mirror(s) or lens/mirror combination(s). It may be desirable to substitute a lens within the imaging element 120 and/or at least one lens within the anamorphic telescope 130 with a mirror or to provide additional mirror elements to effect additional folds in the optical path of the optical system 100 to thereby reduce the overall depth D of the housing 14 (FIGS. 1–3) containing the optical panel 10 and optical system 100. As another example of a variation of the present invention, the anamorphic telescope may alternatively be comprised of more than three lens groups. As yet another example of a variation of the present invention, the waveguides 10a within the optical panel 10 may extend vertically, and the plurality of stacked waveguides 10a may then extend horizontally. In this optical panel 10 alternative configuration, the image source 110 would project light in a correspondingly dimensioned manner and in a horizontal orientation. Thus, it may be envisioned that the optical system 100 of the present invention can be configured to accommodate varying optical panel dimensions, sizes and/or orientations. In still another example of a variation of the present invention, a system such as shown in FIGS. 6 and 7 could be used in a front projection format, for example, by replacing the panel 10 with a screen suitable for front projection. In a further example of a variation of the present invention, different elements such as those having air spaces and/or diffractive optics may alternatively be employed instead of, or in conjunction with, elements having low and high color dispersion in order to achieve chromatic correction. The foregoing description and the following claims are intended to cover all such modifications and variations.

What is claimed is:

1. An optical system for projecting an image onto a display image plane at an incident angle θ which is greater than zero, comprising:
   an image source;
   an imaging element for creating an image from the image source;
   an anamorphic telescope for reducing anamorphic distortion of the image, wherein the anamorphic telescope reduces magnification of the image in a first direction and enlarges magnification of the image in a second direction which is perpendicular to the first direction; and
   a final element for directing the image toward the display image plane.

2. The optical system of claim 1, wherein the imaging element enlarges magnification of the image equally in the first direction and in the second direction.

3. The optical system of claim 1, wherein the imaging element comprises at least one rotationally symmetric surface.

4. The optical system of claim 1, wherein the imaging element includes at least one lens which is comprised of a low color dispersion material, and at least one additional lens which is comprised of a high color dispersion material such that chromatic aberration of the image is corrected.

5. The optical system of claim 4, wherein the low color dispersion material is acrylic.

6. The optical system of claim 4, wherein the low color dispersion material is Zeonex®.

7. The optical system of claim 4, wherein the high color dispersion material is polystyrene.

8. The optical system of claim 1, wherein the imaging element comprises at least one lens which is tilted and decentered with respect to a central longitudinal axis of the image source.

9. The optical system of claim 1, wherein the final element is a mirror.

10. The optical system of claim 9, wherein the final element comprises a biconic surface which is both anamorphic and conic in the first direction and in the second direction.

11. The optical system of claim 1, wherein principal light rays between the final element and the display image plane are non-parallel with respect to each other.

12. The optical system of claim 11, wherein the final element has positive power.

13. The optical system of claim 1, wherein the image source is a chromatic image-combining projector.

14. The optical system of claim 1, wherein a center of curvature of the imaging element, anamorphic telescope, and final element are each aligned within a common plane.

15. The optical system of claim 1, wherein the image source, the imaging element, the anamorphic telescope, and the final element each effect a tilt on the image.

16. The optical system of claim 1, wherein one or more elements selected from the group consisting of the image source, the imaging element, the anamorphic telescope, and the final element effect a tilt on the image.

17. The optical system of claim 1, wherein lenses within the imaging element are each aligned along a central longitudinal optical axis, and wherein at least one lens within the anamorphic telescope is tilted and de-centered with respect to the central longitudinal optical axis.

18. The optical system of claim 1, wherein the anamorphic telescope comprises at least one surface of the type selected from the group consisting of spherical, aspherical, diffractive, and Fresnel surfaces.

19. The optical system of claim 1, wherein lenses within the imaging element are each aligned along a central longitudinal optical axis, and wherein the anamorphic telescope comprises spherical and aspherical surfaces, and wherein at least one lens within the anamorphic telescope is tilted and de-centered with respect to the central longitudinal optical axis.

20. The optical system of claim 1, wherein the final element comprises a Fresnel surface.

21. The optical system of claim 1, wherein the display image plane is defined by end portions of a plurality of optical waveguides.

22. The optical system of claim 1, wherein the incident angle θ is in the range of approximately 50°–85°.

23. The optical system of claim 22, wherein the incident angle θ is approximately 78°.

24. An optical system for projecting an image onto a display image plane at an incident angle θ which is greater than zero, comprising:
- an image source;
- an imaging element for creating an image from the image source;
- an anamorphic telescope for reducing anamorphic distortion of the image, wherein the anamorphic telescope reduces magnification of the image in a first direction and enlarges magnification of the image in a second direction which is perpendicular to the first direction, wherein the anamorphic telescope includes a first lens group, a second lens group, and a third lens group, wherein the first lens group and the second lens group form a first anamorphic telescopic system, and wherein the second lens group and the third lens group form a second anamorphic telescopic system; and
- a final element for directing the image toward the display image plane.

25. The optical system of claim 24, wherein the first anamorphic telescopic system reduces magnification of the image in the first direction.

26. The optical system of claim 25, wherein the second anamorphic telescopic system enlarges magnification of the image in the second direction.

27. The optical system of claim 24, wherein the second anamorphic telescopic system enlarges magnification of the image in the second direction.

28. The optical system of claim 24, wherein the second anamorphic telescopic system reduces magnification of the image in the first direction.

29. The optical system of claim 28, wherein the first anamorphic telescopic system enlarges magnification of the image in the second direction.

30. The optical system of claim 24, wherein the first anamorphic telescopic system enlarges magnification of the image in the second direction.

31. The optical system of claim 24, wherein the first lens group produces negative power in the first direction and positive power in the second direction.

32. The optical system of claim 31, wherein the second lens group produces positive power in the first direction and positive power in the second direction.

33. The optical system of claim 32, wherein the third lens group produces positive power in the first direction and negative power in the second direction.

34. The optical system of claim 24, wherein the first lens group comprises two off-axis rotationally symmetric surfaces and two conic cylindrical surfaces.

35. The optical system of claim 24, wherein the first lens group includes at least one lens which is comprised of a low color dispersion material, and at least one additional lens which is comprised of a high color dispersion material such that chromatic aberration of the image is corrected.

36. The optical system of claim 35, wherein the low color dispersion material is acrylic.

37. The optical system of claim 35, wherein the low color dispersion material is Zeonex®.

38. The optical system of claim 35, wherein the high color dispersion material is polystyrene.

39. The optical system of claim 24, wherein the second lens group comprises two off-axis rotationally symmetric surfaces and two conic cylindrical surfaces.

40. The optical system of claim 24, wherein the second lens group includes at least one lens which is comprised of a low color dispersion material, and at least one additional lens which is comprised of a high color dispersion material such that chromatic aberration of the image is corrected.

41. The optical system of claim 40, wherein the low color dispersion material is acrylic.

42. The optical system of claim 40, wherein the low color dispersion material is Zeonex®.

43. The optical system of claim 40, wherein the high color dispersion material is polystyrene.

44. The optical system of claim 24, wherein the third lens group comprises one off-axis rotationally symmetric surface and five conic cylindrical surfaces.

45. The optical system of claim 24, wherein the third lens group includes at least one lens which is comprised of a low color dispersion material, and at least one additional lens which is comprised of a high color dispersion material such that chromatic aberration of the image is corrected.

46. The optical system of claim 45, wherein the low color dispersion material is acrylic.

47. The optical system of claim 45, wherein the low color dispersion material is Zeonex®.

48. The optical system of claim 45, wherein the high color dispersion material is polystyrene.

49. The optical system of claim 24, wherein the anamorphic telescope performs correction of keystone distortion, and wherein the correction of keystone distortion within the anamorphic telescope is performed primarily by the first lens group with additional correction performed by at least one of the lenses comprising the imaging element, second lens group, and third lens group.

50. The optical system of claim 24, wherein a folding mirror is positioned between the first lens group and the second lens group.

51. The optical system of claim 24, wherein a folding mirror is positioned between the second lens group and the third lens group.

52. The optical system of claim 24, wherein a first folding mirror is positioned between the first lens group and the second lens group, and a second folding mirror is positioned between the second lens group and the third lens group.

53. The optical system of claim 24, wherein each lens group within the anamorphic telescope effects a tilt on the image.

54. A display system having an optical panel and at least one optical system for projecting an image onto a display image plane at an incident angle θ which is greater than zero, said display system comprising:
- an optical panel, comprising:
  - a plurality of stacked optical waveguides, each having a first end and a second end, wherein an outlet face is defined by the plurality of first ends, and wherein an inlet face is defined by the plurality of second ends; and
  - at least one coupler provided at the inlet face which redirects light traveling from an axis non-perpendicular to the inlet face to an axis perpendicular to the inlet face;
- at least one optical system, each said optical system comprising:
  - an image source;
  - an imaging element for creating an image from the image source;
  - an anamorphic telescope for reducing anamorphic distortion of the image, wherein the anamorphic telescope reduces magnification of the image in a first direction and enlarges magnification of the image in a second direction which is perpendicular to the first direction; and a final element for directing the image toward the display image plane.

55. The display system of claim 54, wherein the imaging element enlarges magnification of the image equally in the first direction and in the second direction.

56. The display system of claim 54, wherein the imaging element comprises at least one rotationally symmetric surface.

57. The display system of claim 54, wherein the imaging element includes at least one lens which is comprised of a low color dispersion material, and at least one additional lens which is comprised of a high color dispersion material such that chromatic aberration of the image is corrected.

58. The display system of claim 57, wherein the low color dispersion material is acrylic.

59. The display system of claim 57, wherein the low color dispersion material is Zeonex®.

60. The display system of claim 57, wherein the high color dispersion material is polystyrene.

61. The display system of claim 54, wherein the imaging element comprises at least one lens which is tilted and decentered with respect to a central longitudinal axis of the image source.

62. The display system of claim 54, wherein the final element is a mirror.

63. The display system of claim 62, wherein the final element comprises a biconic surface which is both anamorphic and conic in the first direction and in the second direction.

64. The display system of claim 54, wherein principal light rays between the final element and the display image plane are non-parallel with respect to each other.

65. The display system of claim 64, wherein the final element has positive power.

66. The display system of claim 54, wherein the image source is a chromatic image-combining projector.

67. The display system of claim 54, wherein a center of curvature of the imaging element, anamorphic telescope, and final element are each aligned within a common plane.

68. The display system of claim 54, wherein the image source, the imaging element, the anamorphic telescope, and the final element each effect a tilt on the image.

69. The display system of claim 54, wherein one or more elements selected from the group consisting of the image source, the imaging element, the anamorphic telescope, and the final element effect a tilt on the image.

70. The display system of claim 54, wherein lenses within the imaging element are each aligned along a central longitudinal optical axis, and wherein at least one lens within the anamorphic telescope is tilted and de-centered with respect to the central longitudinal optical axis.

71. The display system of claim 54, wherein the anamorphic telescope comprises at least one surface of the type selected from the group consisting of spherical, aspherical, diffractive, and Fresnel surfaces.

72. The display system of claim 54, wherein lenses within the imaging element are each aligned along a central longitudinal optical axis, and wherein the anamorphic telescope comprises spherical and aspherical surfaces, and wherein at least one lens within the anamorphic telescope is tilted and de-centered with respect to the central longitudinal optical axis.

73. The display system of claim 54, wherein the final element comprises a Fresnel surface.

74. The display system of claim 54, wherein the display image plane is defined by the plurality of first ends of the plurality of waveguides.

75. The display system of claim 54, wherein the incident angle θ is in the range of approximately 50°–85°.

76. The display system of claim 75, wherein the incident angle θ is approximately 78°.

77. The display system of claim 54, wherein the display system comprises two or more optical systems.

78. The display system of claim 54, wherein the display system comprises three optical systems, wherein the optical systems project red, green and blue light, respectively.

79. The display system of claim 54, wherein each of the plurality of waveguides are formed as flat ribbons extending continuously in a horizontal direction along the outlet face.

80. A display system having an optical panel and at least one optical system for projecting an image onto a display image plane at an incident angle θ which is greater than zero, said display system comprising:

an optical panel, comprising:
a plurality of stacked optical waveguides, each having a first end and a second end, wherein an outlet face is defined by the plurality of first ends, and wherein an inlet face is defined by the plurality of second ends; and
at least one coupler provided at the inlet face which redirects light traveling from an axis non-perpendicular to the inlet face to an axis perpendicular to the inlet face;

at least one optical system, each said optical system comprising:
an image source;
an imaging element for creating an image from the image source;
an anamorphic telescope for reducing anamorphic distortion of the image, wherein the anamorphic telescope reduces magnification of the image in a first direction and enlarges magnification of the image in a second direction which is perpendicular to the first direction, wherein the anamorphic telescope includes a first lens group, a second lens group, and a third lens group, wherein the first lens group and the second lens group form a first anamorphic telescopic system, and wherein the second lens group and the third lens group form a second anamorphic telescopic system; and
a final element for directing the image toward the display image plane.

81. The display system of claim 80, wherein the first anamorphic telescopic system reduces magnification of the image in the first direction.

82. The display system of claim 81, wherein the second anamorphic telescopic system enlarges magnification of the image in the second direction.

83. The display system of claim 80, wherein the second anamorphic telescopic system enlarges magnification of the image in the second direction.

84. The display system of claim 80, wherein the second anamorphic telescopic system reduces magnification of the image in the first direction.

85. The display system of claim 84, wherein the first anamorphic telescopic system enlarges magnification of the image in the second direction.

86. The display system of claim 80, wherein the first anamorphic telescopic system enlarges magnification of the image in the second direction.

87. The display system of claim 80, wherein the first lens group produces negative power in the first direction and positive power in the second direction.

88. The display system of claim 87, wherein the second lens group produces positive power in the first direction and positive power in the second direction.

89. The display system of claim 88, wherein the third lens group produces positive power in the first direction and negative power in the second direction.

90. The display system of claim 80, wherein the first lens group comprises two off-axis rotationally symmetric surfaces and two conic cylindrical surfaces.

91. The display system of claim 80, wherein the first lens group includes at least one lens which is comprised of a low color dispersion material, and at least one additional lens which is comprised of a high color dispersion material such that chromatic aberration of the image is corrected.

92. The display system of claim 91, wherein the low color dispersion material is acrylic.

93. The display system of claim 91, wherein the low color dispersion material is Zeonex®.

94. The display system of claim 91, wherein the high color dispersion material is polystyrene.

95. The display system of claim 80, wherein the second lens group comprises two off-axis rotationally symmetric surfaces and two conic cylindrical surfaces.

96. The display system of claim 80, wherein the second lens group includes at least one lens which is comprised of a low color dispersion material, and at least one additional lens which is comprised of a high color dispersion material such that chromatic aberration of the image is corrected.

97. The display system of claim 96, wherein the low color dispersion material is acrylic.

98. The display system of claim 96, wherein the low color dispersion material is Zeonex®.

99. The display system of claim 96, wherein the high color dispersion material is polystyrene.

100. The display system of claim 80, wherein the third lens group comprises one off-axis rotationally symmetric surface and five conic cylindrical surfaces.

101. The display system of claim 80, wherein the third lens group includes at least one lens which is comprised of a low color dispersion material, and at least one additional lens which is comprised of a high color dispersion material such that chromatic aberration of the image is corrected.

102. The display system of claim 101, wherein the low color dispersion material is acrylic.

103. The display system of claim 101, wherein the low color dispersion material is Zeonex®.

104. The display system of claim 101, wherein the high color dispersion material is polystyrene.

105. The display system of claim 80, wherein the anamorphic telescope performs correction of keystone distortion, and wherein the correction of keystone distortion within the anamorphic telescope is performed primarily by the first lens group with additional correction performed by at least one of the lenses comprising the imaging element, second lens group, and third lens group.

106. The display system of claim 80, wherein a folding mirror is positioned between the first lens group and the second lens group.

107. The display system of claim 80, wherein a folding mirror is positioned between the second lens group and the third lens group.

108. The display system of claim 80, wherein a first folding mirror is positioned between the first lens group and the second lens group, and a second folding mirror is positioned between the second lens group and the third lens group.

109. The display system of claim 80, wherein each group within the anamorphic telescope effects a tilt on the image.

110. A method for projecting an image onto a display image plane at an incident angle θ which is greater than zero, said method comprising the steps of:

projecting an image from an image source;

creating an image from the projected image with an imaging element;

reducing anamorphic distortion of the image with an anamorphic element, wherein the anamorphic telescope reduces magnification of the image in a first direction and enlarges magnification of the image in a second direction which is perpendicular to the first direction; and directing the image toward the display image plane with a final element.

111. A method for displaying an image onto a display image plane of an optical panel at an incident angle θ which is greater than zero, said method comprising the steps of:

projecting an image from an image source;

creating an image from the projected image with an imaging element;

reducing anamorphic distortion of the image with an anamorphic element, wherein the anamorphic telescope reduces magnification of the image in a first direction and enlarges magnification of the image in a second direction which is perpendicular to the first direction; and directing the image toward the display image plane with a final element;

wherein the optical panel comprises a plurality of stacked optical waveguides, each having a first end and a second end, wherein an outlet face is defined by the plurality of first ends, wherein an inlet face is defined by the plurality of second ends, and wherein the optical panel further comprises at least one coupler at the inlet face to redirect light traveling from an axis non-perpendicular to the inlet face to an axis perpendicular to the inlet face.

112. A display system having an optical panel and at least one optical system for projecting an image onto a display image plane at an incident angle θ which is greater than zero, said display system comprising:

an optical panel, comprising:
a plurality of stacked optical waveguides, each having a first end and a second end, wherein an outlet face is defined by the plurality of first ends, and wherein an inlet face is defined by the plurality of second ends, the inlet face being substantially parallel to the outlet face; and
at least one coupler provided at the inlet face which redirects light traveling from an axis non-perpendicular to the inlet face to an axis perpendicular to the inlet face;

at least one optical system, each said optical system comprising:
an image source;
an imaging element for creating an image from the image source;
an anamorphic telescope for reducing anamorphic distortion of the image, wherein the anamorphic telescope reduces magnification of the image in a first direction and enlarges magnification of the image in a second direction which is perpendicular to the first direction; and
a final element for directing the image toward the display image plane.

113. A method for displaying an image onto a display image plane of an optical panel at an incident angle θ which is greater than zero, said method comprising the steps of:

projecting an image from an image source;

creating an image from the projected image with an imaging element;

reducing anamorphic distortion of the image with an anamorphic element, wherein the anamorphic telescope reduces magnification of the image in a first direction and enlarges magnification of the image in a second direction which is perpendicular to the first direction; and directing the image toward the display image plane with a final element;

wherein the optical panel comprises a plurality of stacked optical waveguides, each having a first end and a second end, wherein an outlet face is defined by the plurality of first ends, wherein an inlet face is defined by the plurality of second ends, the inlet face being substantially parallel to the outlet face, and wherein the optical panel further comprises at least one coupler at the inlet face to redirect light traveling from an axis non-perpendicular to the inlet face to an axis perpendicular to the inlet face.

114. An optical system for projecting an image onto a display image plane at an incident angle θ which is greater than zero, comprising:

an image source;

an imaging element for creating an image from the image source; and an anamorphic telescope for reducing anamorphic distortion of the image and for directing the image toward the display image plane, wherein the anamorphic telescope reduces magnification of the image in a first direction and enlarges magnification of the image in a second direction which is perpendicular to the first direction.

115. A display system having an optical panel and at least one optical system for projecting an image onto a display image plane at an incident angle θ which is greater than zero, said display system comprising:

an optical panel, comprising:

a plurality of stacked optical waveguides, each having a first end and a second end, wherein an outlet face is defined by the plurality of first ends, and wherein an inlet face is defined by the plurality of second ends; and at least one coupler provided at the inlet face which redirects light traveling from an axis non-perpendicular to the inlet face to an axis perpendicular to the inlet face;

at least one optical system, each said optical system comprising:

an image source;

an imaging element for creating an image from the image source; and an anamorphic telescope for reducing anamorphic distortion of the image and for directing the image toward the display image plane, wherein the anamorphic telescope reduces magnification of the image in a first direction and enlarges magnification of the image in a second direction which is perpendicular to the first direction.

116. A display system having an optical panel and at least one optical system for projecting an image onto a display image plane at an incident angle θ which is greater than zero, said display system comprising:

an optical panel, comprising:

a plurality of stacked optical waveguides, each having a first end and a second end, wherein an outlet face is defined by the plurality of first ends, and wherein an inlet face is defined by the plurality of second ends, the inlet face being substantially parallel to the outlet face; and at least one coupler provided at the inlet face which redirects light traveling from an axis non-perpendicular to the inlet face to an axis perpendicular to the inlet face;

at least one optical system, each said optical system comprising:

an image source;

an imaging element for creating an image from the image source; and an anamorphic telescope for reducing anamorphic distortion of the image and for directing the image toward the display image plane, wherein the anamorphic telescope reduces magnification of the image in a first direction and enlarges magnification of the image in a second direction which is perpendicular to the first direction.

\* \* \* \* \*